(12) United States Patent
Notake

(10) Patent No.: US 12,525,821 B2
(45) Date of Patent: Jan. 13, 2026

(54) WIRELESS POWER TRANSFER FACILITY

(71) Applicant: IHI Corporation, Tokyo (JP)

(72) Inventor: Koki Notake, Tokyo (JP)

(73) Assignee: IHI CORPORATION, Tokyo (JP)

( * ) Notice: Subject to any disclaimer, the term of this patent is extended or adjusted under 35 U.S.C. 154(b) by 775 days.

(21) Appl. No.: 17/852,725

(22) Filed: Jun. 29, 2022

(65) Prior Publication Data

US 2023/0006474 A1 Jan. 5, 2023

(30) Foreign Application Priority Data

Jul. 5, 2021 (JP) .................................. 2021-111557

(51) Int. Cl.
| | | |
|---|---|---|
| *H02J 50/10* | (2016.01) | |
| *H02J 7/00* | (2006.01) | |
| *H02J 50/40* | (2016.01) | |
| *H02J 50/80* | (2016.01) | |

(52) U.S. Cl.
CPC .......... *H02J 50/10* (2016.02); *H02J 7/00712* (2020.01); *H02J 50/402* (2020.01); *H02J 50/80* (2016.02)

(58) Field of Classification Search
CPC ...... H02J 50/10; H02J 7/00712; H02J 50/402; H02J 50/80; H02J 7/02; H02J 2310/48; H02J 7/0013; H02J 50/40; Y02T 10/70; Y02T 10/7072
USPC ....................................................... 320/142
See application file for complete search history.

(56) References Cited

U.S. PATENT DOCUMENTS

| | | |
|---|---|---|
| 2004/0130292 A1 | 7/2004 | Buchanan et al. |
| 2013/0175937 A1 | 7/2013 | Nakajo et al. |
| 2013/0249305 A1 | 9/2013 | Kudo et al. |
| 2014/0139035 A1 | 5/2014 | Ishihara et al. |
| 2015/0115730 A1 | 4/2015 | Kanno et al. |
| 2018/0069441 A1 | 3/2018 | Kanno et al. |

FOREIGN PATENT DOCUMENTS

| | | |
|---|---|---|
| JP | 2001-238490 A | 8/2001 |
| JP | 2006-087214 A | 3/2006 |
| JP | 2007-535282 A | 11/2007 |
| JP | 2011-130569 A | 6/2011 |
| JP | 2012-090476 A | 5/2012 |
| JP | 2013-150428 A | 8/2013 |
| JP | 2013-198327 A | 9/2013 |

(Continued)

*Primary Examiner* — Julian D Huffman
*Assistant Examiner* — Aiman Bickiya
(74) *Attorney, Agent, or Firm* — Volpe Koenig

(57) ABSTRACT

A wireless power transfer facility includes: a power factor correction device that converts AC front-stage input power received from a commercial power source into DC front-stage output power and has a plurality of output terminals for outputting the front-stage output power; a plurality of inverters that are respectively connected to the output terminals of the power factor correction device and convert DC rear-stage input power including the DC front-stage output power received from the output terminals into AC rear-stage output power; a plurality of power transmission coils that are respectively connected to the plurality of inverters and receive the rear-stage output power; and a control device that performs control so that the front-stage input power output to the power factor correction device does not exceed allowable power of the commercial power source.

2 Claims, 15 Drawing Sheets

(56) References Cited

FOREIGN PATENT DOCUMENTS

| | | |
|---|---|---|
| JP | 2014-045536 A | 3/2014 |
| JP | 2014-103751 A | 6/2014 |
| JP | 2015-039271 A | 2/2015 |
| JP | 2015-111998 A | 6/2015 |
| JP | 2016-025691 A | 2/2016 |
| JP | 5927582 B2 | 6/2016 |
| JP | 6075173 B2 | 2/2017 |
| JP | 2017-046398 A | 3/2017 |
| JP | 6187384 B2 | 8/2017 |
| JP | 2021-078184 A | 5/2021 |
| WO | WO-2011055186 A1 * 5/2011 ............. H02J 3/005 |
| WO | 2018/185810 A1 | 10/2018 |

* cited by examiner

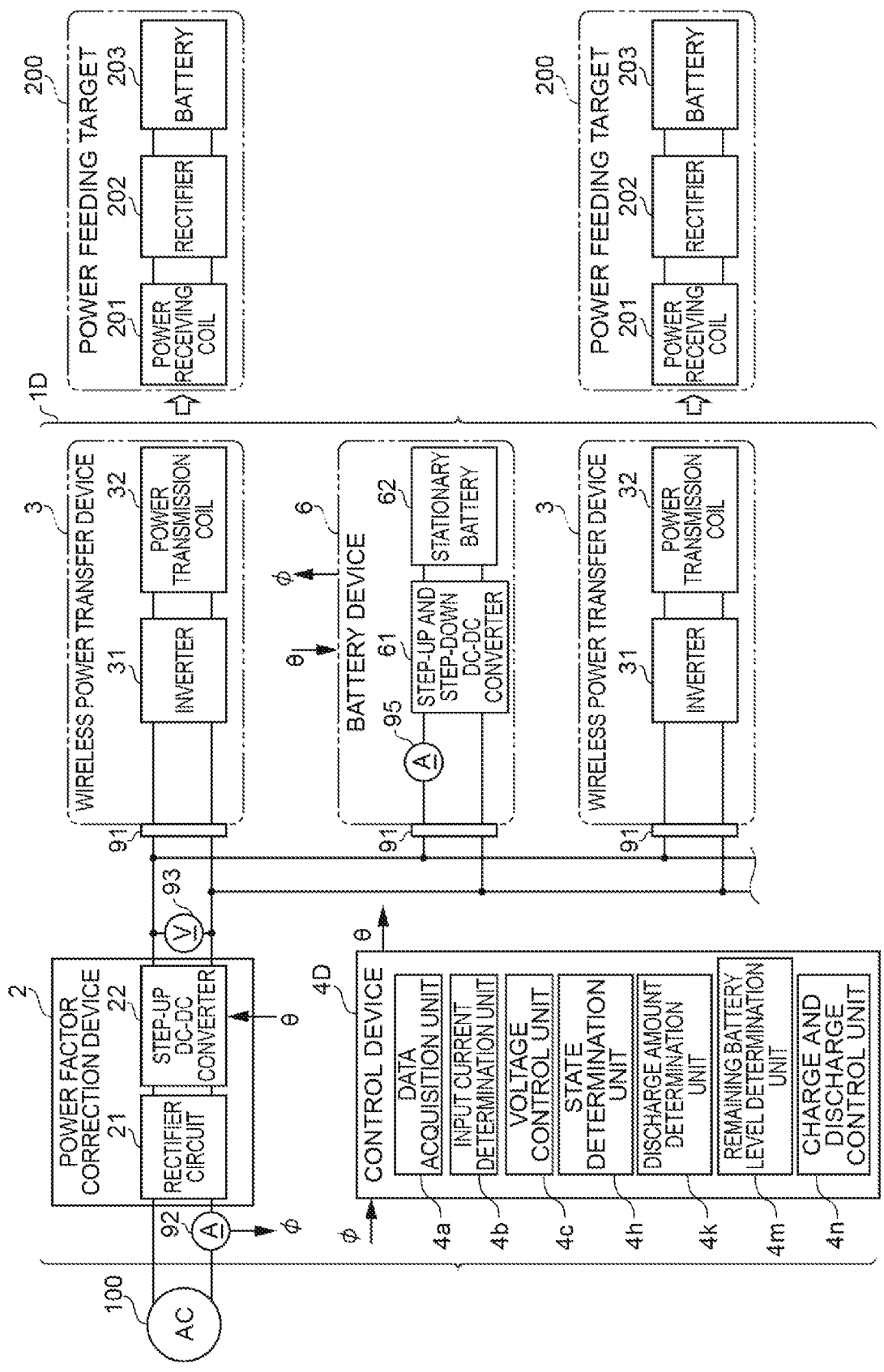

WIRELESS POWER TRANSFER FACILITY

CROSS-REFERENCE TO RELATED APPLICATIONS

This application claims the benefit of priority from Japanese Patent Application No. 2021-111557, filed on Jul. 5, 2021, the entire contents of which are incorporated herein by reference.

BACKGROUND

Japanese Patent No. 6075173, Japanese Patent No. 6187384, Japanese Unexamined Patent Publication No. 2011-130569, Japanese Patent No. 5927582, and Japanese Unexamined Patent Publication No. 2006-87214 disclose techniques relevant to a wireless power transfer device. For example, Japanese Patent No. 6075173 discloses a basic electric circuit configuration of a wireless power transfer device. Japanese Patent No. 6187384, Japanese Unexamined Patent Publication No. 2011-130569, Japanese Patent No. 5927582, and Japanese Unexamined Patent Publication No. 2006-87214 disclose a circuit that outputs power from one power source device to a plurality of power transmitters.

SUMMARY

A wireless power transfer facility according to the present disclosure includes: a front-stage power conversion unit that converts AC (alternating current) front-stage input power received from an external power source into DC (direct current) front-stage output power and has a plurality of output terminals for outputting the front-stage output power; a plurality of rear-stage power conversion units that are respectively connected to the output terminals of the front-stage power conversion unit and convert DC rear-stage input power including the DC front-stage output power received from the output terminals into AC rear-stage output power; a plurality of coils that are respectively connected to the plurality of rear-stage power conversion units and receive the rear-stage output power; and a controller that performs control so that the front-stage input power output to the front-stage power conversion unit does not exceed allowable power of the external power source.

BRIEF DESCRIPTION OF THE DRAWINGS

FIG. 12 is a block diagram showing a wireless power transfer facility according to a third embodiment.

DETAILED DESCRIPTION

Figure 1:
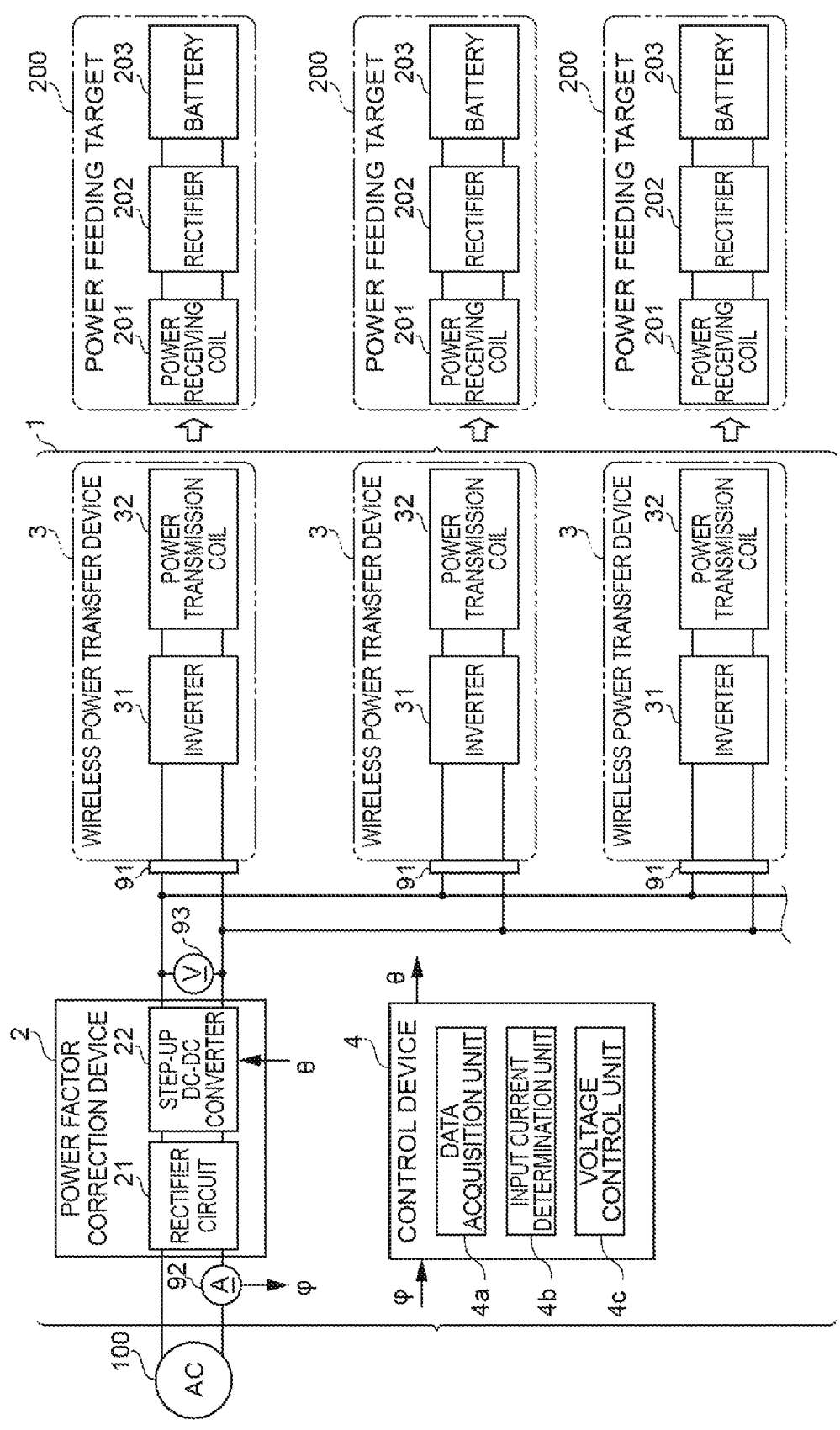
FIG. 1 is a block diagram showing a wireless power transfer facility according to a first embodiment.

For example, a wireless power transfer facility including a plurality of wireless power transfer devices may be installed in a parking lot or the like. In the wireless power transfer facility, all of the plurality of wireless power transfer devices may transmit power. In the wireless power transfer facility, some of the wireless power transfer devices may transmit power. The timing at which power transmission is started differs for each of the plurality of wireless power transfer devices. The timing at which power transmission is stopped also differs for each of the plurality of wireless power transfer devices. Then, the power consumed by the wireless power transfer facility may increase or decrease depending on the number of wireless power transfer devices that transmit power. As the number of wireless power transfer devices that transmit power increases, the power consumption increases.

However, there is a limitation on the power that can be consumed by the wireless power transfer facility. The upper limit of the power that can be consumed by the wireless power transfer facility is determined, for example, by the capacity of a breaker. In addition, the upper limit of the power is also determined by the power capacity determined by the contract with the power company. Then, depending on the operating condition of the wireless power transfer device, the upper limit of the power that can be consumed may be exceeded. Therefore, the wireless power transfer facility needs to be managed so that the power consumption does not exceed the upper limit.

In the present disclosure, a wireless power transfer facility that can be managed so that the power consumption does not exceed the upper limit with a simple configuration will be described.

A wireless power transfer facility according to the present disclosure includes: a front-stage power conversion unit that converts AC front-stage input power received from an external power source into DC front-stage output power and has a plurality of output terminals for outputting the front-stage output power; a plurality of rear-stage power conversion units that are respectively connected to the output terminals of the front-stage power conversion unit and convert DC rear-stage input power including the DC front-stage output power received from the output terminals into AC rear-stage output power; a plurality of coils that are respectively connected to the plurality of rear-stage power conversion units and receive the rear-stage output power; and a controller that performs control so that the front-stage input power output to the front-stage power conversion unit does not exceed allowable power of the external power source.

The wireless power transfer facility includes a controller. The controller performs control so that the front-stage input power output to the front-stage power conversion unit does not exceed the allowable power of the external power source. As a result, in the wireless power transfer facility, the management of the power that does not exceed the upper limit can be realized by the control performed by the controller. Therefore, with a simple configuration, the wireless power transfer facility can be managed so that the power consumption does not exceed the upper limit.

The rear-stage input power of the wireless power transfer facility described above may be configured only by the front-stage output power. The front-stage power conversion unit may include: a rectifier unit that receives the front-stage input power and outputs DC intermediate power by rectifying the front-stage input power; and a transformer unit that receives the intermediate power and outputs the front-stage output power by transforming a voltage of the intermediate power. The controller may perform: an operation of instructing the transformer unit to output a first voltage as a voltage of the front-stage output power; an operation of obtaining information regarding the front-stage input power and comparing the information regarding the front-stage input power with a threshold value when the front-stage output power as the first voltage is output from the front-stage power conversion unit; and an operation of instructing the transformer unit to output a second voltage lower than the first voltage as a voltage of the front-stage output power when the information regarding the front-stage input power is not equal to or less than the threshold value. According to this configuration, by controlling the front-stage power conversion unit, it is possible to collectively suppress the power output to the plurality of rear-stage power conversion units. Therefore, it is possible to manage the power consumption with a simple configuration.

In the wireless power transfer facility described above, the transformer unit may include a step-up unit that steps up the voltage of the intermediate power to a value corresponding to an instruction of the controller. According to this configuration, the configuration of the transformer unit can be simplified.

In the wireless power transfer facility described above, the transformer unit may include: a step-up unit that steps up the voltage of the intermediate power to a predetermined voltage; and a step-down unit that steps down a voltage of power output from the step-up unit to a value corresponding to an instruction of the controller. According to this configuration, the circuit configuration of the step-up unit can be simplified.

In the wireless power transfer facility described above, the number of step-down units provided in the transformer unit may be the same as the number of rear-stage power conversion units. The step-down unit may be arranged in series with the rear-stage power conversion unit. According to this configuration, it is possible to simplify the configuration of the wiring for connecting the front-stage power conversion unit to the rear-stage power conversion unit.

In the wireless power transfer facility described above, the number of step-down units provided in the transformer unit may be one. The step-down unit may be connected in parallel with a wiring for connecting the step-up unit to the rear-stage power conversion unit. According to this configuration, since the transformer unit includes one step-down unit, the configuration of the transformer unit can be simplified.

In the wireless power transfer facility described above, the rear-stage input power may be configured by the front-stage output power and auxiliary power. The wireless power transfer facility described above may further include an auxiliary power output unit that is connected to the rear-stage power conversion unit to output the auxiliary power to the rear-stage power conversion unit. The controller may control the auxiliary power output unit. According to this configuration, the insufficient power can be covered by the auxiliary power output from the auxiliary power output unit.

In the wireless power transfer facility described above, the auxiliary power output unit may be at least one of the plurality of rear-stage power conversion units. The rear-stage power conversion unit serving as the auxiliary power output unit may receive AC coil output power from the coil and convert the coil output power into the DC auxiliary power. The controller may perform: an operation of obtaining information regarding the front-stage input power and comparing the information regarding the front-stage input power with a threshold value when the front-stage output power is output from the front-stage power conversion unit; and an operation of outputting the auxiliary power from the rear-stage power conversion unit serving as the auxiliary power output unit when the information regarding the front-stage input power is not equal to or less than the threshold value. According to this configuration, some rear-stage power conversion units can be used as auxiliary power output units. Therefore, it is not necessary to additionally provide a component as an auxiliary power output unit. As a result, the configuration of the wireless power transfer facility can be simplified.

In the wireless power transfer facility described above, the auxiliary power output unit may be a battery. The controller may perform: an operation of obtaining information regarding the front-stage input power and comparing the information regarding the front-stage input power with a threshold value when the front-stage output power is output from the front-stage power conversion unit; an operation of charging the battery with the front-stage input power when the information regarding the front-stage input power is equal to or less than the threshold value; and an operation of discharging the auxiliary power from the battery when the information regarding the front-stage input power is not equal to or less than the threshold value. According to this configuration, auxiliary power can be output from the battery. In addition, surplus power can be stored in the battery.

Hereinafter, a wireless power transfer facility will be described in detail with reference to the drawings. In addition, in the description of the drawings, the same elements are denoted by the same reference numerals. In the description of the drawings, the corresponding elements are also denoted by the same reference numerals. Repeated descriptions thereof may be omitted.

First Embodiment

A wireless power transfer facility 1 shown in FIG. 1 wirelessly transmits power to a plurality of power feeding targets 200. For power transmission from the wireless power transfer facility 1 to the power feeding target 200, for example, an electromagnetic wave having a frequency of 85 kHz is used.

The power feeding target 200 is, for example, an electric vehicle with a battery. The power feeding target 200 includes a power receiving coil 201, a rectifier 202, and a battery 203. The power receiving coil 201 wirelessly receives power from the wireless power transfer facility 1. The power receiving coil 201 can also transmit power to the wireless power transfer facility 1. The rectifier 202 converts the high-frequency AC power output from the power receiving coil 201 into power of another mode. The rectifier 202 converts, for example, 85 kHz AC power into DC power. The DC power output from the rectifier 202 charges the battery 203.

The power feeding target 200 is not limited to the electric vehicle. The power feeding target 200 may be various movable objects that require the supply of power. The wireless power transfer facility 1 is installed, for example, in a parking lot that can accommodate a plurality of vehicles. The wireless power transfer facility 1 may be installed in a roadside strip or the like beside a road.

The wireless power transfer facility 1 includes one power factor correction device 2, a plurality of wireless power transfer devices 3, and a control device 4.

In the first embodiment, the power factor correction device 2 corresponds to a front-stage power conversion unit. Therefore, the power received from a commercial power source 100 by the power factor correction device 2 is front-stage input power. The power output from the power factor correction device 2 to the wireless power transfer device 3 is front-stage output power. The power factor correction device 2 is connected to an external power source, such as the commercial power source 100. The power factor correction device 2 converts the power received from the commercial power source 100 into power of a mode required by the wireless power transfer device 3. For example, the power factor correction device 2 receives AC power having a frequency of 50 Hz or 60 Hz from the commercial power source 100. The power factor correction device 2 outputs power to a plurality of wireless power transfer devices 3 in response to requests from the plurality of wireless power transfer devices 3. The power factor correction device 2 outputs, for example, DC power having a voltage of 500 V or less to the wireless power transfer devices 3.

The power factor correction device 2 can output power to one wireless power transfer device 3. The power factor correction device 2 can also output power to two or more wireless power transfer devices 3. The number of wireless power transfer devices 3 to which the power factor correction device 2 can output power is not particularly limited as long as the limited capacity of the commercial power source 100, which will be described later, is satisfied. When the power is output to the plurality of wireless power transfer devices 3, there is no particular limitation on the timing of starting the output of the power and the timing of stopping the output of the power.

FIG. 1 shows a configuration in which three wireless power transfer devices 3 are connected to the power factor correction device 2. The plurality of wireless power transfer devices 3 share one power factor correction device 2. In the wireless power transfer facility 1, a DC power source bus, which is the output of the power factor correction device 2, is branched. In the wireless power transfer facility 1, a plurality of inverters 31 and a plurality of power transmission coils 32 are connected in parallel with the power factor correction device 2. The number of wireless power transfer devices 3 connected to the power factor correction device 2 may be two or more. Therefore, the power factor correction device 2 has a plurality of output terminals 91. As the output terminal 91, a configuration capable of connecting a plurality of wireless power transfer devices 3 to the power factor correction device 2 is shown as an element. The output terminal 91 may be a physical or virtual element. The output terminal 91 is not limited to a physical component such as a connector.

The power factor correction device 2 includes a rectifier circuit 21 and a step-up DC-DC converter 22 (step-up unit). The power factor correction device 2 including the rectifier circuit 21 and the step-up DC-DC converter 22 functions as a so-called power factor correction (PFC) circuit. In the first embodiment, the rectifier circuit 21 corresponds to a rectifier unit. In the first embodiment, the step-up DC-DC converter 22 corresponds to a transformer unit.

Figure 2A:
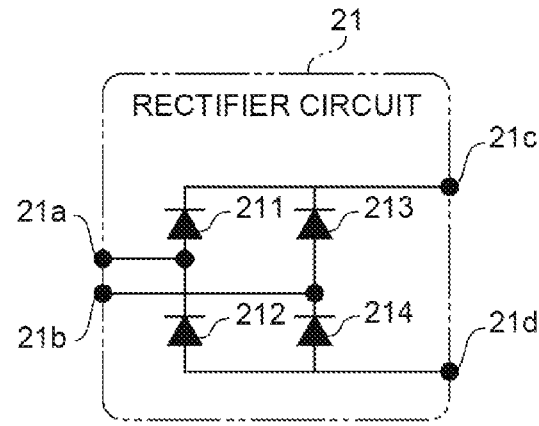
FIG. 2A is an example of a rectifier circuit shown in FIG. 1.

The rectifier circuit 21 converts AC power into DC power. The specific circuit configuration of the rectifier circuit 21 is not particularly limited. As the rectifier circuit 21, for example, a circuit shown in FIG. 2A may be adopted. The rectifier circuit 21 has four diodes 211, 212, 213, and 214. The diode 211 is connected in series with the diode 212. The diode 213 is connected in series with the diode 214. The set of diodes 211 and 212 is connected in parallel with the set of diodes 213 and 214. The input of the diode 211 is connected to a first input 21$a$ of the rectifier circuit 21. The input of the diode 213 is connected to a second input 21$b$ of the rectifier circuit 21. The outputs of the diodes 211 and 213 are connected to a first output 21$c$ of the rectifier circuit 21. The outputs of the diodes 212 and 214 are connected to a second output 21$d$ of the rectifier circuit 21.

Figure 2B:
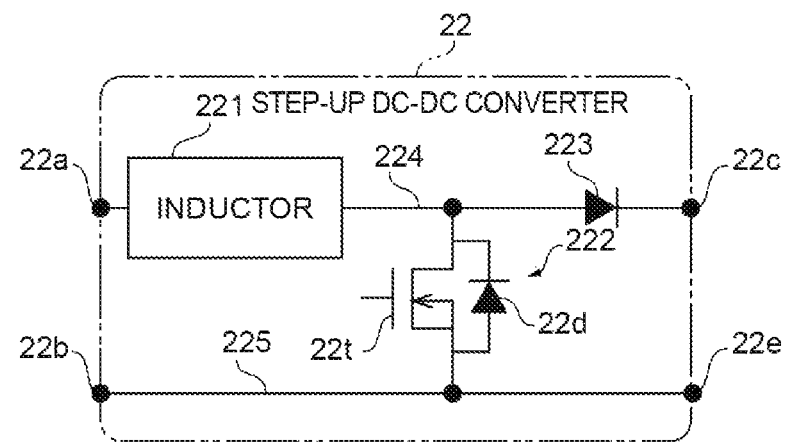
FIG. 2B is an example of a step-up DC-DC converter shown in FIG. 1.

In the wireless power transfer device 3, the transmitted power increases as the voltage of the received DC power increases. In the wireless power transfer device 3, the transmitted power decreases as the voltage of the received DC power decreases. Therefore, the step-up DC-DC converter 22 can control the transmitted power of the wireless power transfer device 3 by transforming the voltage of the power applied to the wireless power transfer device 3 into a predetermined voltage. The step-up DC-DC converter 22 steps up the voltage of the input DC power. Therefore, the voltage of the power output from the step-up DC-DC converter 22 is higher than the voltage of the input power. The specific circuit configuration of the step-up DC-DC converter 22 is not particularly limited. As the step-up DC-DC converter 22, for example, a circuit shown in FIG. 2B may be adopted.

The step-up DC-DC converter 22 includes an inductor 221, a switch function unit 222, and a diode 223. The switch function unit 222 has a transistor 22$t$ and a diode 22$d$. The transistor 22$t$ and the diode 22$d$ are connected in parallel with each other. The inductor 221 and the diode 223 are arranged between a first input 22$a$ and a first output 22$c$ of the step-up DC-DC converter 22. The inductor 221 is connected to the first input 22$a$. The diode 223 is connected to the first output 22$c$. A second input 22$b$ of the step-up DC-DC converter 22 is connected to a second output 22$e$ by a wiring 225. A wiring 224 connects the inductor 221 to the diode 223. The wiring 225 connects the second input 22$b$ to the second output 22$e$. The switch function unit 222 is connected between the wiring 224 and the wiring 225.

The step-up DC-DC converter 22 receives a control signal θ output from the control device 4. The voltage of the power output from the step-up DC-DC converter 22 follows the control signal θ. The step-up DC-DC converter 22 controls the voltage of the output power by ON/OFF control of the transistor 22$t$ that functions as a switching element. The control signal θ is output to the gate of the transistor 22$t$.

The plurality of wireless power transfer devices 3 have the same configuration. The wireless power transfer device 3 is installed at a position where power is transmitted to the power feeding target 200. Therefore, the distance from the power factor correction device 2 to each wireless power transfer device 3 is relatively long. The distance from the power factor correction device 2 to each wireless power transfer device 3 is determined by the position where the wireless power transfer device 3 is installed. Therefore, the distance from the power factor correction device 2 to each wireless power transfer device 3 may be different for each wireless power transfer device 3.

The wireless power transfer device 3 includes an inverter 31 and a power transmission coil 32.

In the first embodiment, the inverter 31 corresponds to a rear-stage power conversion unit. Therefore, the power received by the inverter 31 is rear-stage input power. In the first embodiment, the wireless power transfer device 3 receives power only from the power factor correction device 2. Therefore, the sum of the rear-stage input powers received by one or more inverters 31 is equal to the front-stage output power output from the power factor correction device 2.

Figure 2C:
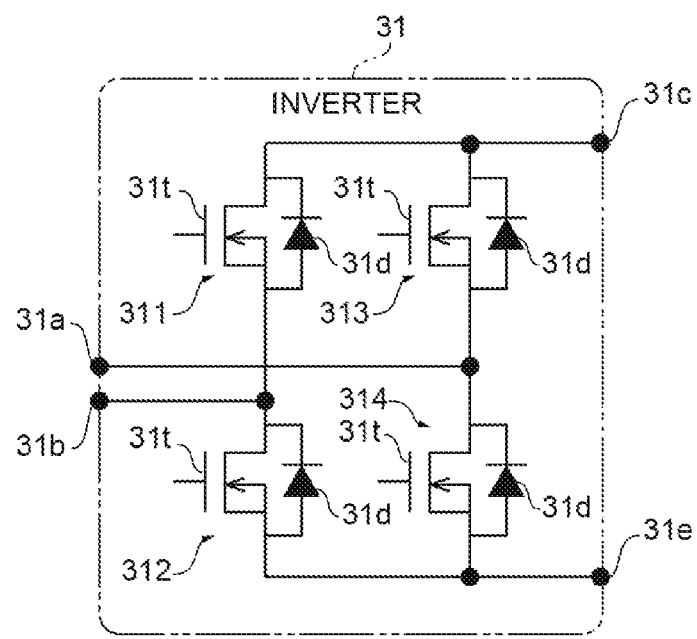
FIG. 2C is an example of an inverter shown in FIG. 1.

The inverter 31 is connected to the power factor correction device 2. The inverter 31 receives DC power from the power factor correction device 2. The inverter 31 converts the received DC power into predetermined AC power required by the power transmission coil 32. The specific circuit configuration of the inverter 31 is not particularly limited. As the inverter 31, for example, a circuit shown in FIG. 2C may be adopted.

The inverter 31 has four switch function units 311, 312, 313, and 314. The switch function unit 311 has a transistor 31*t* and a diode 31*d*. The transistor 31*t* is connected in parallel with the diode 31*d*. The switch function units 312, 313, and 314 have the same configuration. The switch function unit 311 is connected in series to the switch function unit 312. The switch function unit 313 is connected in series to the switch function unit 314. The set of switch function units 311 and 312 is connected in parallel with the set of switch function units 313 and 314. One end of the set of switch function units 311 and 312 is connected to a first output 31*c* of the inverter 31. One end of the set of switch function units 313 and 314 is also connected to the first output 31*c* of the inverter 31. The other end of the set of switch function units 311 and 312 is connected to a second output 31*e* of the inverter 31. The other end of the set of switch function units 313 and 314 is also connected to the second output 31*e* of the inverter 31. A second input 31*b* of the inverter 31 is connected to the wiring for connecting the switch function units 311 and 312 to each other. A first input 31*a* of the inverter 31 is connected to the wiring for connecting the switch function units 313 and 314 to each other.

The power transmission coil 32 transmits power to the power receiving coil 201 mounted in the power feeding target 200 by wireless power transfer. The power transmission coil 32 is housed in a housing. In addition to the power transmission coil 32, components such as a ferrite plate, which is a magnetic member, and a resonance circuit may be housed in the housing. For example, the inverter 31 may be housed in the housing. The power transmission coil 32 is a spiral coil. The spiral coil is also called a circular coil around which a conductive wire such as a litz wire is wound. As the power transmission coil 32, other types may be adopted. For example, a solenoid type coil may be adopted as the power transmission coil 32.

The control device 4 operates the wireless power transfer facility 1 so that the power received from the commercial power source 100 by the power factor correction device 2 does not exceed the upper limit value. Specifically, the control device 4 controls the DC bus voltage of the power factor correction device 2 so that the value of an ammeter 92 does not exceed the upper limit value. The function of controlling the DC bus voltage is realized by the control device 4 controlling the power factor correction device 2.

Figure 3:
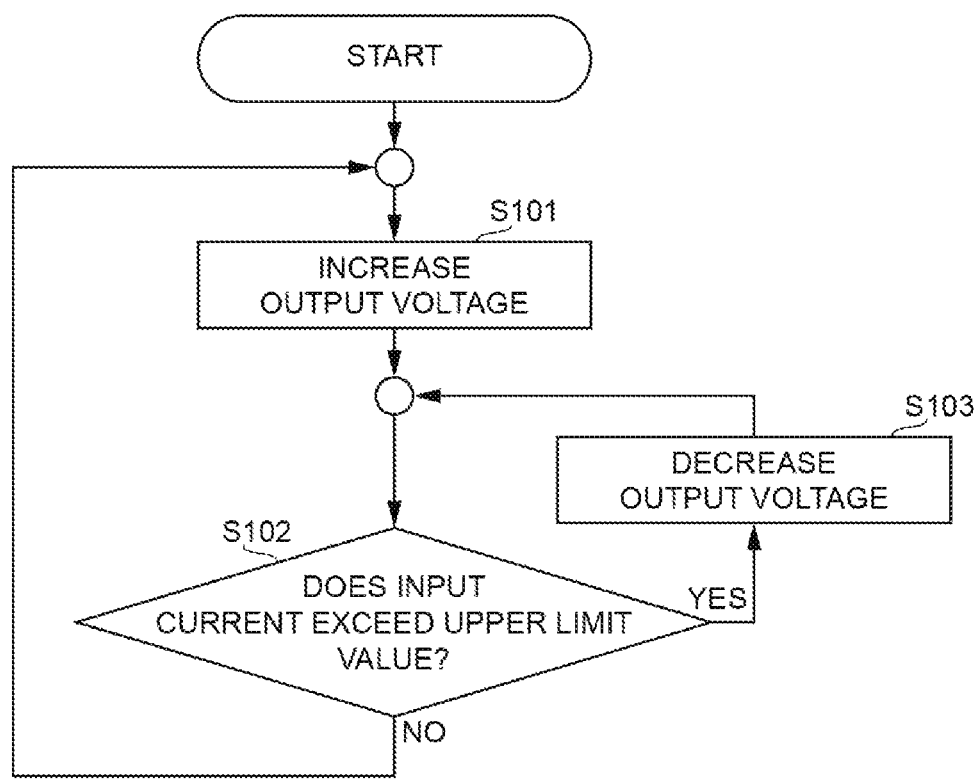
FIG. 3 is a flowchart showing the operation of a control device provided in the wireless power transfer facility according to the first embodiment.

FIG. 3 is a flowchart showing the operation of the control device 4.

First, the control device 4 sets an output voltage that is zero as an initial state. The "output voltage" referred to in the following description can be known by a voltmeter 93 shown in FIG. 1. Then, the control device 4 outputs a control signal θ for increasing the output voltage by the amount of increase set in advance (step S101). The amount of increase is less than the maximum allowable value of the output voltage.

The control device 4 compares the input current with the upper limit value (step S102). The control device 4 acquires the input current. The input current can be acquired from the ammeter 92 provided in the wiring for connecting the commercial power source 100 and the power factor correction device 2 to each other. The input current is an example of information φ regarding the front-stage input power output from the commercial power source 100 to the power factor correction device 2. As the information φ regarding the front-stage input power, the power output from the commercial power source 100 to the power factor correction device 2 may be adopted in addition to the input current. Then, the control device 4 determines whether or not the input current exceeds the upper limit value.

When it is determined in step S102 that the input current does not exceed the upper limit value (step S102: NO), the control device 4 outputs a control signal θ for increasing the output voltage (step S101). When the output voltage increases, the input current output from the commercial power source 100 to the power factor correction device 2 increases. When the input current does not exceed the upper limit value, the control device 4 repeats the comparison between the input current and the upper limit value (step S102) and the output of the control signal θ for increasing the output voltage (step S101). According to this repetition, when the input current does not exceed the upper limit value, the output voltage gradually increases.

When it is determined in step S102 that the input current exceeds the upper limit value (step S102: YES), the control device 4 outputs a control signal θ for decreasing the output voltage (step S103). When the output voltage decreases, the input current output from the commercial power source 100 to the power factor correction device 2 decreases. After step S103, the control device 4 compares the input current with the upper limit value again (step S102). When the input current exceeds the upper limit value, the control device 4 repeats the comparison between the input current and the upper limit value (step S102) and the output of the control signal θ for decreasing the output voltage (step S103). According to this repetition, when the input current exceeds the upper limit value, the output voltage gradually decreases.

The control device 4 is, for example, a computer. The operation of the control device 4 is realized by the computer executing a program. As shown in FIG. 1, the control device 4 has a functional component for realizing the above operation. The control device 4 includes a data acquisition unit 4*a*, an input current determination unit 4*b*, and a voltage control unit 4*c*. The functions performed by these functional components are realized by the CPU executing a program.

The data acquisition unit 4*a* receives information regarding the front-stage input power from an external device. The external device is, for example, the ammeter 92. The data acquisition unit 4a receives the input current from the ammeter 92. The data acquisition unit 4a executes a part of step S102. The external device that outputs the information regarding the front-stage input power to the data acquisition unit 4a is not limited to the ammeter 92. The data acquisition unit 4a may acquire a power value as information regarding the front-stage input power from a power meter provided in the commercial power source 100.

The input current determination unit 4b compares the information regarding the front-stage input power with the threshold value. The threshold value is an upper limit value. The upper limit value is set in advance according to the breaker capacity, the contracted power capacity, and the like. The control device 4 according to the first embodiment adopts an input current as an upper limit value. As the upper limit value, power may be adopted in addition to the input current. The input current determination unit 4b compares the input current acquired by the data acquisition unit 4a with the upper limit value. The input current determination unit 4b executes a part of step S102. As a result of comparison, the input current determination unit 4b outputs either the result that "the input current exceeds the upper limit value" or the result that "the input current does not exceed the upper limit value".

The voltage control unit 4c determines the output voltage to be output to the power factor correction device 2 according to the result of the input current determination unit 4b. The voltage control unit 4c decreases the output voltage based on the result that "the input current exceeds the upper limit value". The voltage control unit 4c increases the output voltage based on the result that "the input current does not exceed the upper limit value". The voltage control unit 4c performs the operations of steps S101 and S103.

Figure 4:
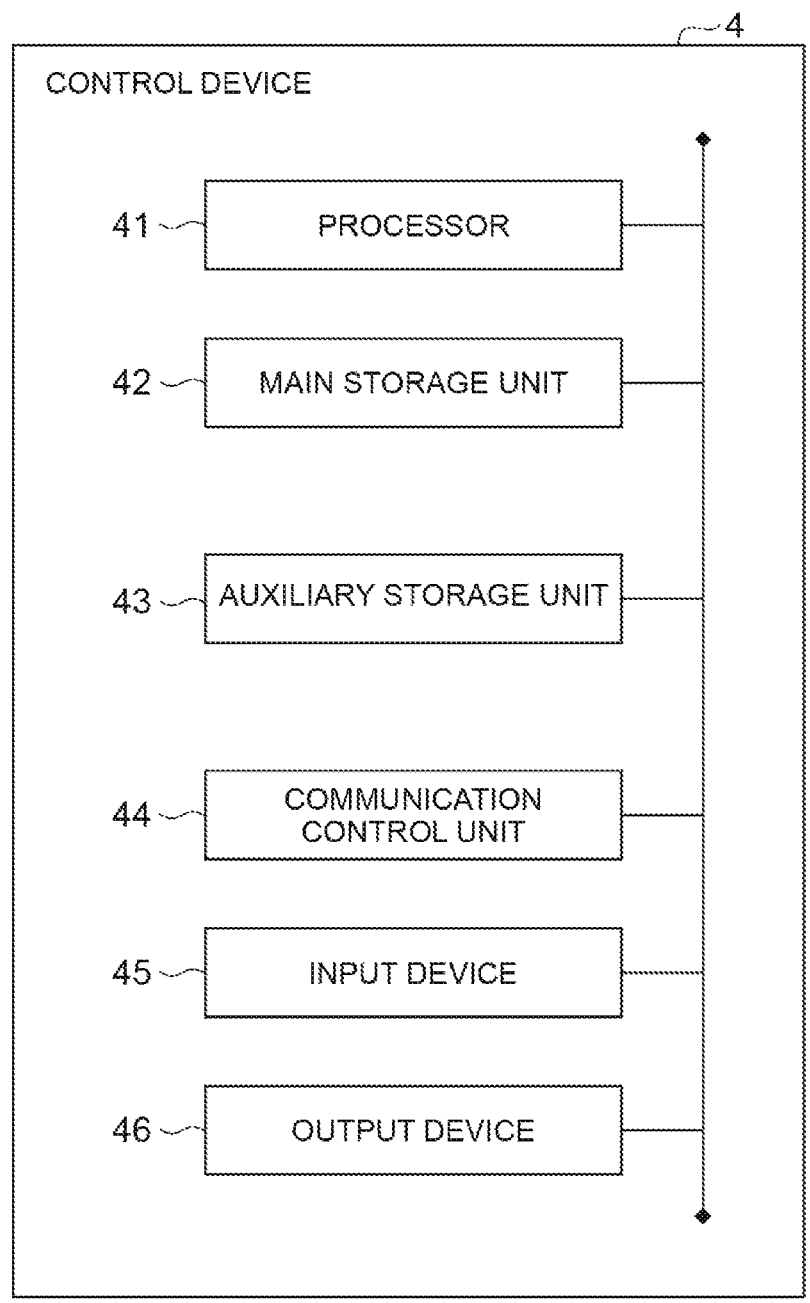
FIG. 4 is an example showing the configuration of a control device shown in FIG. 1.

The control device 4 is realized by a computer having a hardware configuration shown in FIG. 4. The control device 4 includes one or more computers. The computer includes a processor 41, a main storage unit 42, an auxiliary storage unit 43, a communication control unit 44, an input device 45, and an output device 46. The control device 4 is configured by one or more computers that include these hardware components and use software such as a program.

When the control device 4 is configured by a plurality of computers, the plurality of computers may be connected locally, or may be connected through a communication network such as the Internet or an intranet. By this connection, one control device 4 is logically constructed.

The processor 41 executes an operating system, an application program, and the like. The main storage unit 42 is configured to include a read only memory (ROM) and a random access memory (RAM). The auxiliary storage unit 43 is a storage medium, such as a hard disk and a flash memory. The auxiliary storage unit 43 generally stores a larger amount of data than the main storage unit 42. The communication control unit 44 is a network card or a wireless communication module. The input device 45 is configured to include a keyboard, a mouse, a touch panel, a microphone for voice input, and the like. The output device 46 is configured to include a display, a printer, and the like.

The auxiliary storage unit 43 stores data necessary for the program and processing in advance. The program enables the computer to realize the functional components of the control device 4. By the program, for example, processing relevant to the above-described power adjustment method is performed in the computer. For example, the program is read by the processor 41 or the main storage unit 42. By the program, at least one of the processor 41, the main storage unit 42, the auxiliary storage unit 43, the communication control unit 44, the input device 45, and the output device 46 operates. For example, by the program, data is read from and written into the main storage unit 42 and the auxiliary storage unit 43.

The program may be provided after being recorded on a tangible storage medium, such as a CD-ROM, a DVD-ROM, or a semiconductor memory. The program may be provided as a data signal through a communication network.

Description of Operation Example

Next, an operation example of the wireless power transfer facility 1 will be described with reference to FIGS. 5A to 5F. In the operation example, it is assumed that, in the wireless power transfer facility 1, the number of power feeding targets 200 increases one by one from a state in which the number of power feeding targets 200 is zero to a state in which the number of power feeding targets 200 is four. It is assumed that the number of power feeding targets 200 decreases one by one in order from the power feeding target 200 of which charging is completed from a state in which the number of power feeding targets 200 is four to a state in which the number of power feeding targets 200 is two. As the upper limit value of the input current, 120 A is exemplified. As the upper limit value of the output voltage, 500 V is exemplified. In addition, when the input current from the commercial power source 100 does not reach the upper limit value, the output voltage is set to the maximum voltage that can be output. As a result, the power provided to the inverter 31 to output the power can be maximized.

Figure 5A:
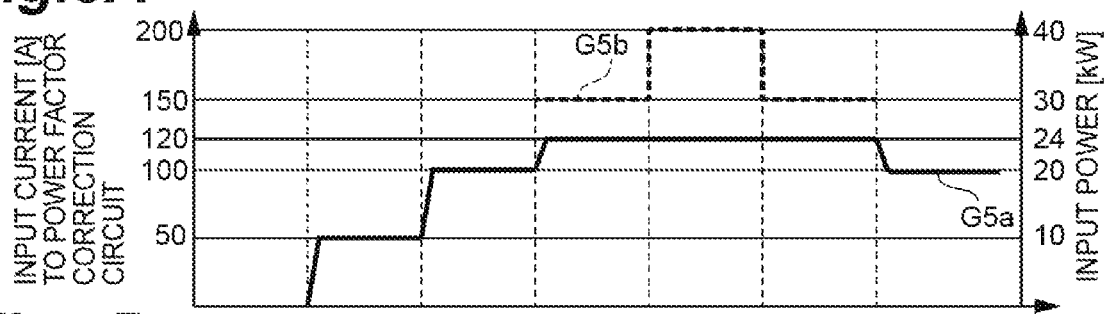
FIGS. 5A to 5F are charts for explaining an operation example of the wireless power transfer facility according to the first embodiment.
Figure 5B:
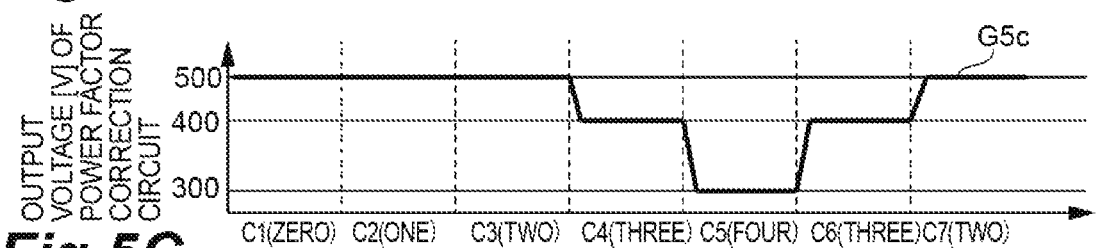
Figure 5C:
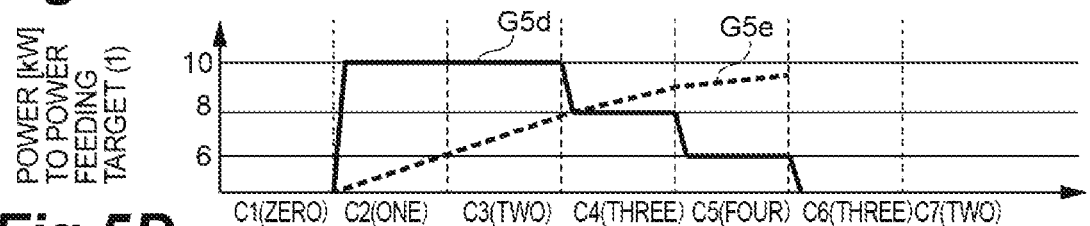
Figure 5D:
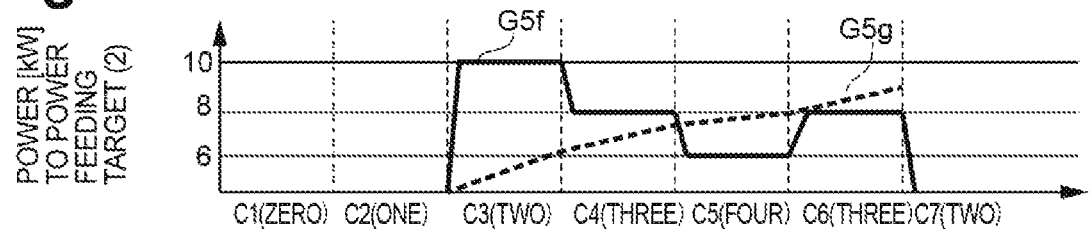
Figure 5E:
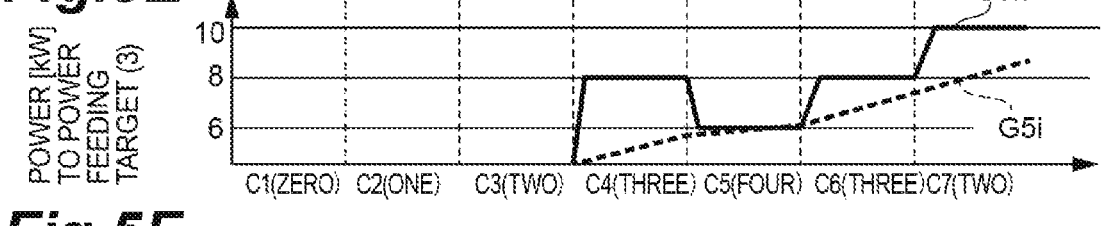
Figure 5F:
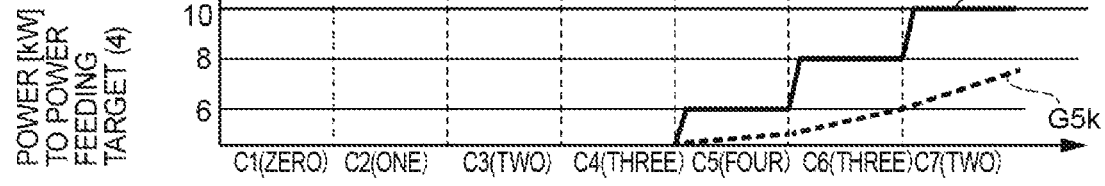

FIG. 5A shows an input current (graph G5a) output from the commercial power source 100 to the power factor correction device 2. FIG. 5B shows output power (graph G5c) output from the power factor correction device 2. FIG. 5C shows power (graph G5d) output to the first power feeding target 200 and the remaining battery level (graph G5e) of the battery 203 of the power feeding target 200. FIG. 5D shows power (graph G5f) output to the second power feeding target 200 and the remaining battery level (graph G5g) of the battery 203 of the power feeding target 200. FIG. 5E shows power (graph G5h) output to the third power feeding target 200 and the remaining battery level (graph G5i) of the battery 203 of the power feeding target 200. FIG. 5F shows power (graph G5j) output to the fourth power feeding target 200 and the remaining battery level (graph G5k) of the battery 203 of the power feeding target 200.
<When the Number of Power Feeding Targets is Zero: State C1>

The power output to each power feeding target 200 is 0 kW. The input current is 0 A. The output voltage is 500 V.
<When the Number of Power Feeding Targets Increases from Zero to One: State C2>

It is assumed that the power output to the first power feeding target 200 is 10 kW. The power output to the second, third, and fourth power feeding targets 200 is 0 kW. In this case, the input current is 50 A. When this is converted into power, the power is 10 kW. That is, when there is only one power feeding target 200, the input current does not exceed the upper limit value (120 A). Therefore, since it is not necessary to decrease the output voltage, the output voltage is maintained at 500 V.
<When the Number of Power Feeding Targets Increases from One to Two: State C3>

It is assumed that the power output to each of the first and second power feeding targets 200 is 10 kW. The power output to each of the third and fourth power feeding targets 200 is 0 kW. In this case, the input current is 100 A. When this is converted into power, the power is 20 kW. Even when there are two power feeding targets 200, the input current does not exceed the upper limit value (120 A). Therefore, since it is not necessary to decrease the output voltage, the output voltage is maintained at 500 V.

<When the Number of Power Feeding Targets Increases from Two to Three: State C4>

It is assumed that the power output to each of the first, second, and third power feeding targets 200 is 10 kW. The power output to the fourth power feeding target 200 is 0 kW. If the control device 4 does not perform control to suppress the input current, the input current will be 150 A (see the graph G5b shown by the broken line). When this is converted into power, the power is 24 k. When the control device 4 performs control to suppress the input current, the control device 4 repeats steps S102 and S103 until the input current falls below the upper limit value (120 A). As a result of repeating steps S102 and S103, the output voltage gradually decreases. As a result, the control device 4 maintains an output voltage (for example, 400 V) at which the input current is below the upper limit value 120 A. When the control to suppress the input current is performed, the output voltage decreases from 500 V to 400 V, so that the power of 10 kW cannot be output to the power feeding target 200. When the output voltage is 400 V, it is assumed that the power output to each power feeding target 200 is 8 kW. In other words, when the upper limit value of the input current is 120 A, the upper limit value of the power is 24 k. The plurality of power feeding targets 200 share the power of 24 k. Assuming that the power is evenly distributed, each of the three power feeding targets 200 can receive the power of 8 kW.

<When the Number of Power Feeding Targets Increases from Three to Four: State C5>

It is assumed that the power output to each of the first, second, third, and fourth power feeding targets 200 is 10 kW. If the control device 4 does not perform control to suppress the input current, the input current will be 200 A (see the graph G5b shown by the broken line). When this is converted into power, the power is 40 kW. The control device 4 repeats steps S102 and S103 until the input current falls below the upper limit value (120 A). As a result of repeating steps S102 and S103, the output voltage gradually decreases further from 400 V. The control device 4 maintains an output voltage (for example, 300 V) at which the input current is below the upper limit value 120 A. When the control to suppress the input current is performed, the output voltage decreases from 400 V to 300 V, so that the power of 8 kW cannot be output to the power feeding target 200. When the output voltage is 300 V, the power output to each power feeding target 200 is 6 kW.

<When the Number of Power Feeding Targets Decreases from Four to Three: State C6>

It is assumed that the charging of the first power feeding target 200 is completed and the number of power feeding targets decreases from four to three. In this case, it is assumed that the power output to each power feeding target 200 is 6 kW. As a result, the power to be received from the commercial power source 100 is 18 kW. The input current is below the upper limit (step S102: NO). The control device 4 repeatedly executes steps S101 and S102 until the input current reaches the upper limit value. During the repetition, the output voltage gradually increases. The control device 4 maintains an output voltage (for example, 400 V) at which the input current reaches the upper limit value (120 A). As a result, the power output to each of the second, third, and fourth power feeding target 200 is 8 kW.

<When the Number of Power Feeding Targets Decreases from Three to Two: State C7>

It is assumed that the charging of the second power feeding target 200 is further completed and the number of power feeding targets decreases from three to two. In this case, it is assumed that the power output to each power feeding target 200 is 8 kW. As a result, the power to be received from the commercial power source 100 is 16 kW. The input current is below the upper limit (step S102: NO). The control device 4 repeatedly executes steps S101 and S102 until the input current reaches the upper limit value. During the repetition, the output voltage gradually increases from 400 V. The control device 4 maintains an output voltage (500 V) at which the input current reaches the upper limit value (120 A). As a result, the power output to each of the third and fourth power feeding targets 200 is 10 kW.

Operational Effect

The wireless power transfer facility 1 includes the control device 4 that is a controller. The control device 4 performs control so that the front-stage input power output to the power factor correction device 2 does not exceed the allowable power of the commercial power source 100. The wireless power transfer facility 1 can realize the management of the power that does not exceed the upper limit by the control performed by the control device 4. Therefore, the wireless power transfer facility 1 can be managed so that the power consumption does not exceed the upper limit with a simple configuration. According to this configuration, by controlling the power factor correction device 2, it is possible to collectively suppress the power output to the plurality of inverters 31. Therefore, the wireless power transfer facility 1 can manage the power consumption with a simple configuration.

The power factor correction device 2 includes the rectifier circuit 21 that receives front-stage input power and outputs intermediate DC power by rectifying the front-stage input power and the step-up DC-DC converter 22 that outputs front-stage output power by transforming the voltage of the intermediate power. The power factor correction device 2 performs an operation of instructing the transformer unit to output a first voltage as a voltage of front-stage output power (step S101), an operation of obtaining an input current, which is information regarding the front-stage input power output to the power factor correction device 2, and comparing the input current with the upper limit value when the power factor correction device 2 outputs the front-stage output power that is the first voltage (step S102), and an operation of instructing the transformer unit to output a second voltage lower than the first voltage as a voltage of the front-stage output power when the input current is not equal to or less than the upper limit value (step S103). According to this configuration, by controlling the power factor correction device 2, it is possible to collectively suppress the power output to the plurality of inverters 31. Therefore, it is possible to manage the power consumption with a simple configuration.

The step-up DC-DC converter 22 of the wireless power transfer facility 1 steps up the voltage of the intermediate power to a value corresponding to the control signal θ of the control device 4. According to this configuration, the configuration of the power factor correction device 2 can be simplified.

In the wireless power transfer facility 1, it is possible to control the output of a plurality of wireless power transfer devices 3 by controlling one power factor correction device 2 with the control device 4. The control device 4 of the wireless power transfer facility 1 does not directly transmit the control signal θ to the plurality of wireless power transfer devices 3. According to this configuration, it is not necessary to provide a configuration for receiving the control signal θ in each of the wireless power transfer devices 3. The wireless power transfer facility 1 does not need to include a communication means for transmitting the control signal θ from the control device 4 to the wireless power transfer device 3 by wire or wirelessly. Therefore, the system configuration of the wireless power transfer facility 1 can be simplified. The transmission and reception of the control signal θ may be realized between the ammeter 92 and the control device 4 and between the control device 4 and the power factor correction device 2. Therefore, since the configuration for transmitting and receiving the control signal θ is simplified, it is possible to suppress the influence of noise mixed in the control signal θ. As a result, it is possible to suppress the occurrence of malfunction due to noise.

The power output from the commercial power source 100 is output to the power feeding target 200 through the power factor correction device 2, the inverter 31, and the power transmission coil 32. When the configuration including the power factor correction device 2, the inverter 31, and the power transmission coil 32 is treated as one wireless power transfer device, it is necessary to prepare the same number of power factor correction devices 2, inverters 31, and power transmission coils 32 as the number of wireless power transfer devices. The inverter 31 and the power transmission coil 32 of the wireless power transfer facility 1 according to the first embodiment are arranged at each power feeding place. On the other hand, the power factor correction device 2 is not arranged at power feeding place. The wireless power transfer facility 1 includes only one power factor correction device 2. Therefore, in the wireless power transfer facility 1, it is not necessary to prepare a plurality of power factor correction devices 2. As a result, the system configuration of the wireless power transfer facility 1 can be simplified. In other words, it is possible to suppress an increase in the scale of the system configuration of the wireless power transfer facility 1. In addition, it is possible to suppress the complexity of the system configuration of the wireless power transfer facility 1. In addition, since it is not necessary to prepare a plurality of power factor correction devices 2, the grounding area required for installing the wireless power transfer facility 1 can be reduced. In addition, the cost required for installing the wireless power transfer facility 1 can be reduced.

In the wireless power transfer facility 1, parallel arrangement is made on the downstream side from the power factor correction device 2. The output of the power factor correction device 2 is a direct current. In the wireless power transfer facility 1, circuits through which a direct current flows are parallelized. When circuits through which a direct current flows are parallelized, a high-frequency electromagnetic wave is not generated from the electric wire forming each circuit, unlike an electric wire through which a high-frequency current flows. Therefore, in the wireless power transfer facility 1, there is no need for measures against high-frequency electromagnetic waves. In addition, as the number of power transmission coils 32 increases, the length of the electric wire increases. For the electric wire through which a high-frequency current flows, a component such as a shield is required as measures to satisfy the regulations stipulated in the Radio Law or measures to apply to EMC standards. However, in the wireless power transfer facility 1, not circuits through which a high-frequency current flows but circuits through which a direct current flows are parallelized. Therefore, in the wireless power transfer facility 1, there is no need for measures such as those required for circuits through which a high-frequency current flows. In a circuit through which a high-frequency current flows, the longer the electric wire, the greater the heat generation and loss generated when a current flows through the electric wire. In the wireless power transfer facility 1, since the circuits through which a direct current flows are branched, it is possible to suppress the heat generation and loss due to the flow of such a high-frequency current.

First Modification Example

The function of adjusting the voltage to be output to the inverter 31 is realized by the step-up DC-DC converter 22 that is a transformer unit. The transformer unit is configured by one step-up DC-DC converter 22. For example, the transformer unit may be configured to include a step-up circuit that steps up the voltage of the intermediate power output from the rectifier circuit 21 and a step-down circuit that steps down the step-up voltage to a predetermined voltage.

Figure 6:
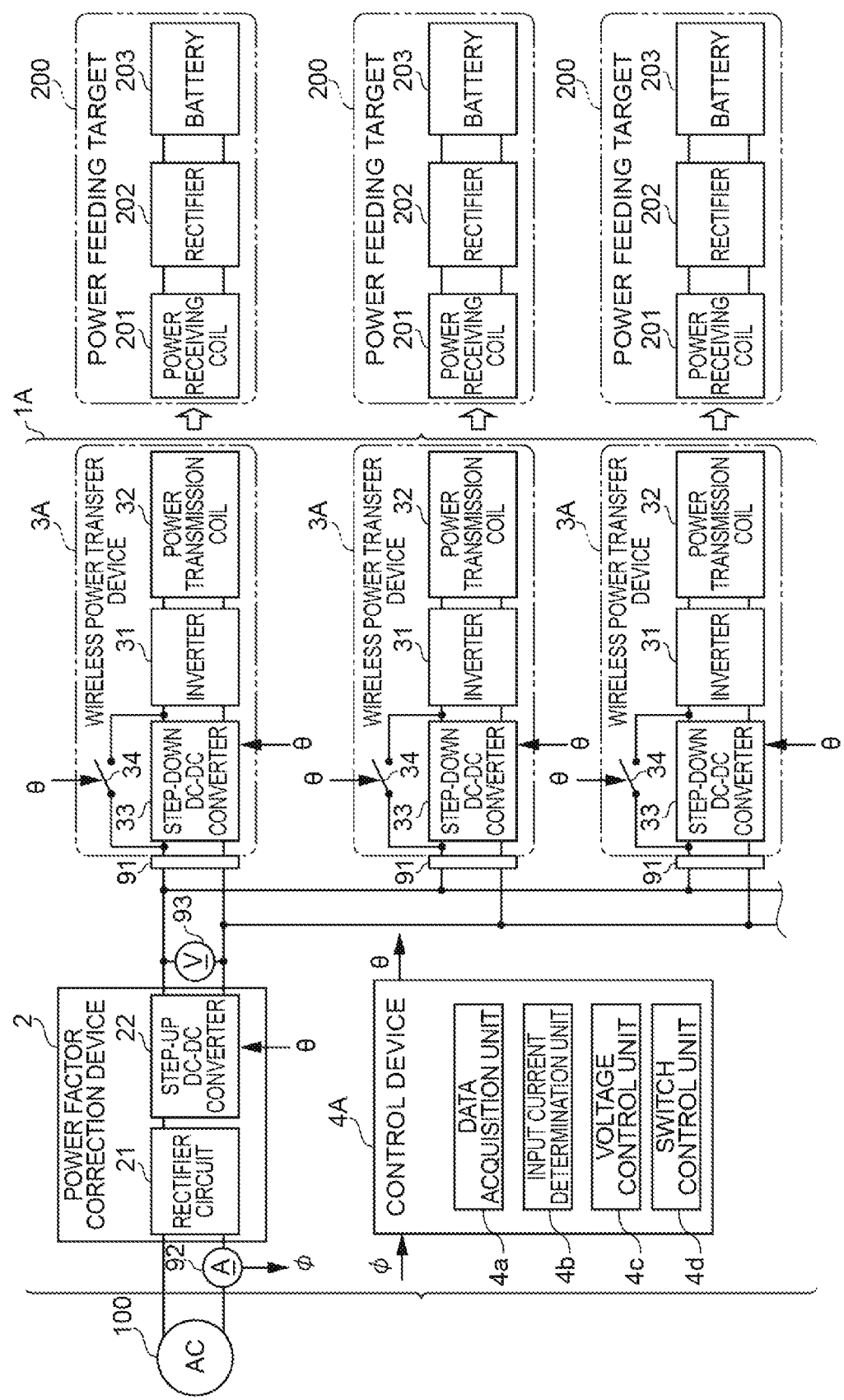
FIG. 6 is a block diagram showing a wireless power transfer facility of a first modification example.

As shown in FIG. 6, a wireless power transfer facility 1A of a first modification example includes one power factor correction device 2 and a plurality of wireless power transfer devices 3A. The power factor correction device 2 includes a rectifier circuit 21 and a step-up DC-DC converter 22. The voltage output from the step-up DC-DC converter 22 of the first modification example is a fixed value. For example, the voltage output from the step-up DC-DC converter 22 of the first modification example may always be 500 V.

The wireless power transfer device 3A further includes a step-down DC-DC converter 33 (step-down unit) in addition to the inverter 31 and the power transmission coil 32. The number of step-down DC-DC converters 33 is the same as the number of wireless power transfer devices 3A. The step-down DC-DC converter 33 receives power from the step-up DC-DC converter 22. The step-down DC-DC converter 33 steps down the received power. The step-down DC-DC converter 33 outputs the step-down power to the inverter 31. The step-down DC-DC converter 33 is connected in series with the step-up DC-DC converter 22. The step-down DC-DC converter 33 is also connected in series with the inverter 31. When it is necessary to limit the input current, the step-down DC-DC converter 33 is used. In other words, when it is necessary to decrease the voltage of the power output to the inverter 31, the step-down DC-DC converter 33 is used. A switch 34 is connected in parallel with the step-down DC-DC converter 33. When the switch 34 is turned on, the power (voltage of 500 V) output from the step-up DC-DC converter 22 can be output to the inverter 31. When the switch 34 is turned off, the power having a voltage stepped down by the step-down DC-DC converter 33 can be output to the inverter 31.

Figure 7:
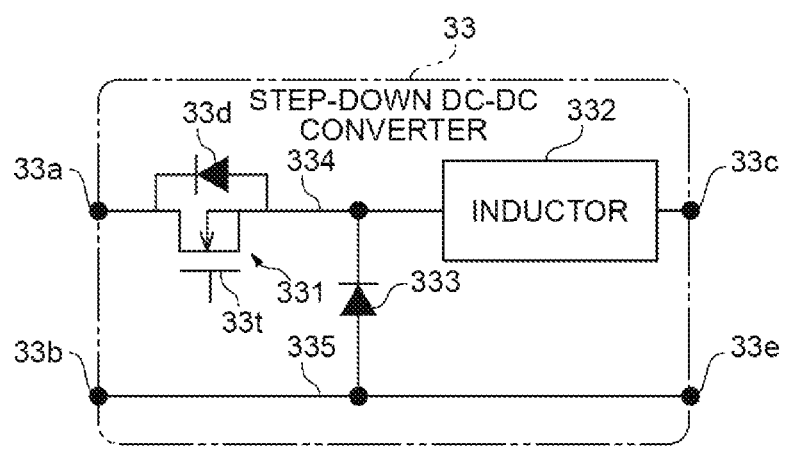
FIG. 7 is an example of a step-down DC-DC converter shown in FIG. 6.

As the step-down DC-DC converter 33, a circuit shown in FIG. 7 may be adopted.

The step-down DC-DC converter 33 includes a switch function unit 331, an inductor 332, and a diode 333. The switch function unit 331 has a transistor 33t and a diode 33d. The transistor 33t and the diode 33d are connected in parallel with each other. The switch function unit 331 and the inductor 332 are arranged between a first input 33a and a first output 33c of the step-down DC-DC converter 33. The switch function unit 331 is connected to the first input 33*a*. The inductor 332 is connected to the first output 33*c*. A second input 33*b* of the step-down DC-DC converter 33 is connected to a second output 33*e* by a wiring 335. A wiring 334 connects the switch function unit 331 to the inductor 332. The wiring 335 connects the second input 33*b* to the second output 33*e*. The diode 333 is connected between the wiring 334 and the wiring 335.

It is assumed that there is no need to decrease the output voltage (for example, the state C2 in FIGS. 5A to 5F). In this case, power having a voltage of 500 V may be output to the inverter 31. A switch control unit 4*d* of a control device 4A outputs a control signal θ for turning on the switch 34. By this operation, the power output from the step-up DC-DC converter 22 is output to the inverter 31.

It is assumed that the output voltage needs to be decreased (for example, the state C5 in FIGS. 5A to 5F). In this case, it is necessary to output power having a voltage lower than 500 V to the inverter 31. The switch control unit 4*d* of the control device 4A outputs a control signal θ for turning off the switch 34. The control device 4A outputs a control signal θ for decreasing the voltage to a predetermined value to the step-down DC-DC converter 33. By this operation, the power output from the step-down DC-DC converter 33 is output to the inverter 31.

Even with the wireless power transfer facility 1A of the first modification example, power management can be performed with a simple configuration.

Second Modification Example

Figure 8:
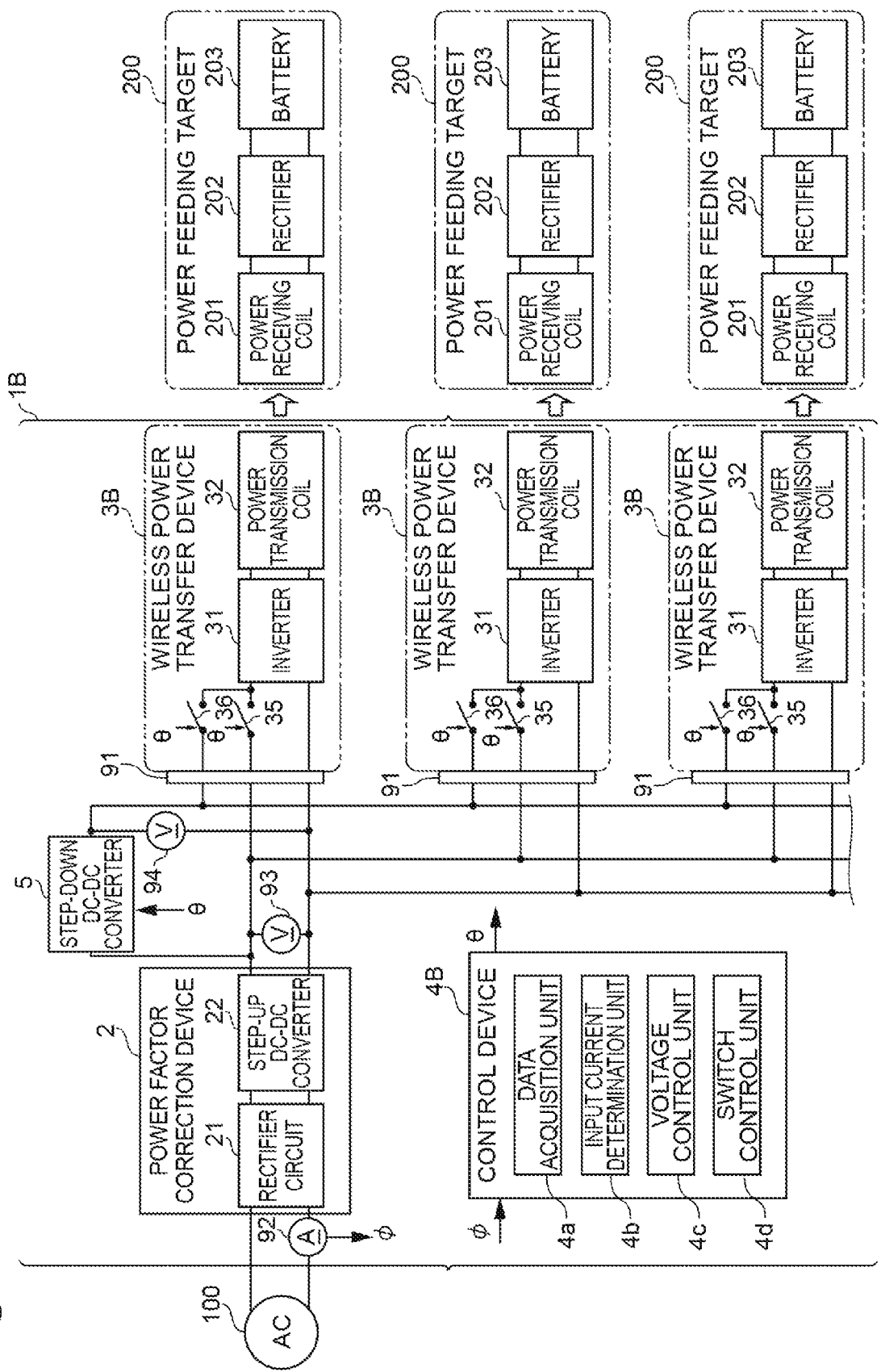
FIG. 8 is a block diagram showing a wireless power transfer facility of a second modification example.

The example in which the transformer unit is configured to include the step-up DC-DC converter 22 and the step-down DC-DC converter 33 is not limited to the configuration exemplified in the first modification example. As shown in FIG. 8, a wireless power transfer facility 1B, which is a second modification example, includes one power factor correction device 2, a plurality of wireless power transfer devices 3B, and one step-down DC-DC converter 5.

The configuration of the power factor correction device 2 of the second modification example is the same as the configuration of the power factor correction device 2 in the first modification example. The operation of the power factor correction device 2 of the second modification example is the same as the operation of the power factor correction device 2 in the first modification example. The power factor correction device 2 of the second modification example always outputs power having a DC voltage of 500 V.

One step-down DC-DC converter 5 is connected in parallel with a wiring for connecting the power factor correction device 2 and the plurality of wireless power transfer devices 3B. The input of the step-down DC-DC converter 5 is connected to the power factor correction device 2. The output of the step-down DC-DC converter 5 is connected to a plurality of output terminals 91. Therefore, in the case of the second modification example, the output terminal 91 is connected to the first output and the second output of the step-up DC-DC converter 22, and is also connected to the output of the step-down DC-DC converter 5.

The wireless power transfer device 3B further includes switches 35 and 36 in addition to the inverter 31 and the power transmission coil 32. The switch 35 is arranged between the step-up DC-DC converter 22 and the inverter 31. The switch 36 is arranged between the step-down DC-DC converter 33 and the inverter 31.

It is assumed that there is no need to decrease the output voltage (for example, the state C2 in FIGS. 5A to 5F). In this case, power having a DC voltage of 500 V may be output to the inverter 31. A switch control unit 4*d* of a control device 4B outputs a control signal θ for turning on the switch 35. The switch control unit 4*d* of the control device 4B outputs a control signal θ for turning off the switch 36. By this operation, the power output from the step-up DC-DC converter 22 is output to the inverter 31.

It is assumed that the output voltage needs to be decreased (for example, the state C5 in FIGS. 5A to 5F). In this case, it is necessary to output power having a voltage lower than 500 V to the inverter 31. First, the control device 4B outputs a control signal θ for decreasing the voltage to a predetermined value to the step-down DC-DC converter 33. The output voltage of the step-down DC-DC converter 33 may be obtained by a voltmeter 94. Then, the switch control unit 4*d* of the control device 4B outputs a control signal θ for turning off the switch 35. Then, the switch control unit 4*d* of the control device 4B outputs a control signal θ for turning on the switch 36. By this operation, the power output from the step-down DC-DC converter 33 is output to the inverter 31.

Even with the wireless power transfer facility 1B of the second modification example, power management can be performed with a simple configuration.

Second Embodiment

Figure 9:
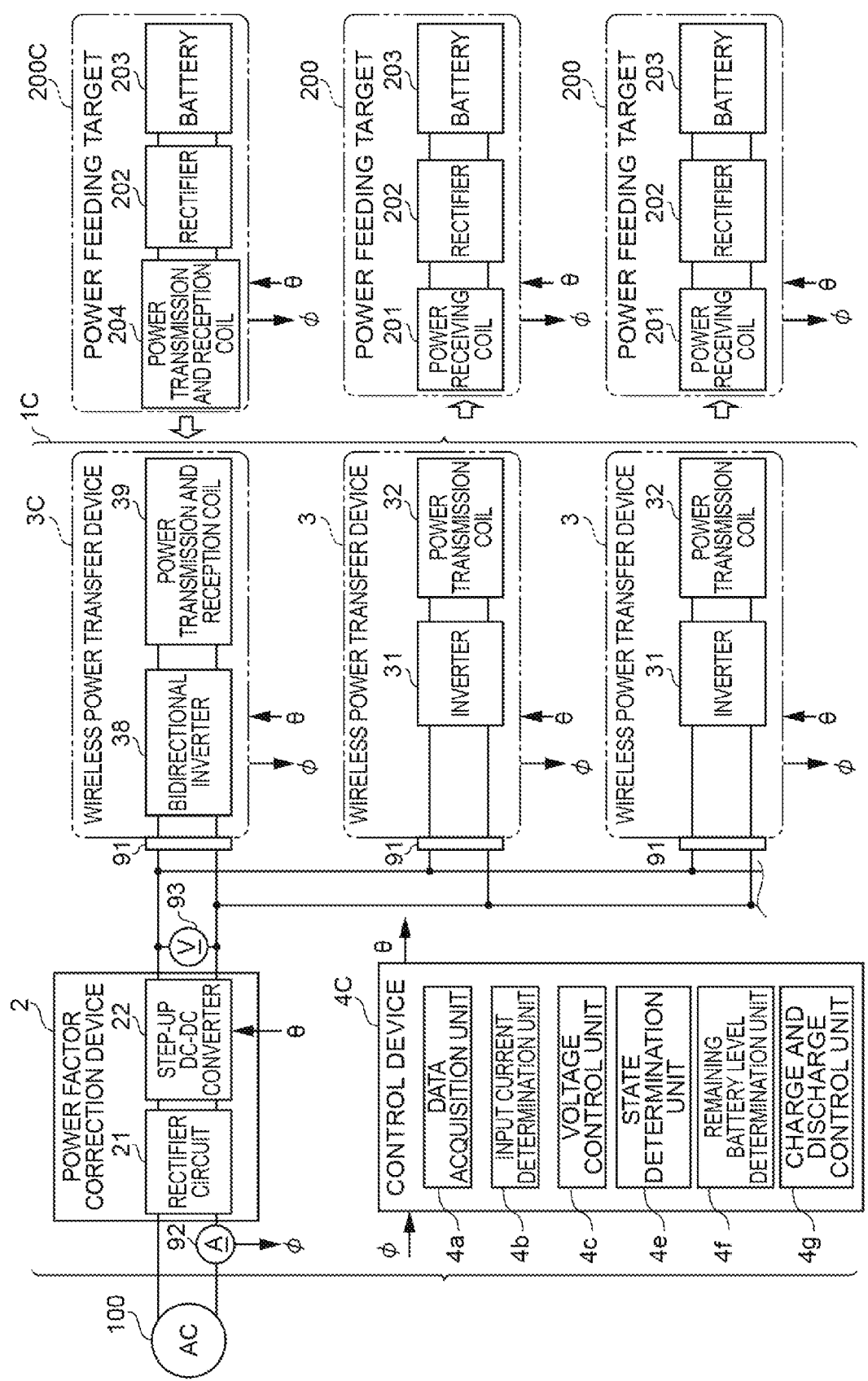
FIG. 9 is a block diagram showing a wireless power transfer facility according to a second embodiment.

FIG. 9 shows a wireless power transfer facility 1C according to a second embodiment. In the wireless power transfer facility 1 according to the first embodiment, the output voltage of the power factor correction device 2 is adjusted so that the current received from the commercial power source 100 by the power factor correction device 2 does not exceed the upper limit value. In the wireless power transfer facility 1C according to the second embodiment, another method is used to prevent the current received from the commercial power source 100 by the power factor correction device 2 from exceeding the upper limit value. The current received from the commercial power source 100 by the power factor correction device 2 exceeds the upper limit value is a state in which the power required by the wireless power transfer device 3 exceeds the power that can be received from the commercial power source 100. That is, there is a shortage of power. In the wireless power transfer facility 1C according to the second embodiment, auxiliary power for supplementing the insufficient power is used to prevent the current received from the commercial power source 100 by the power factor correction device 2 from exceeding the upper limit value.

The wireless power transfer facility 1C includes one power factor correction device 2, a plurality of wireless power transfer devices 3, and one control device 4C. The power factor correction device 2 includes a rectifier circuit 21 and a step-up DC-DC converter 22. The configuration of the rectifier circuit 21 is the same as the configuration of the rectifier circuit 21 in the first embodiment. The operation of the rectifier circuit 21 is also the same as that of the rectifier circuit 21 in the first embodiment. The configuration of the step-up DC-DC converter 22 is the same as the configuration of the step-up DC-DC converter 22 in the first embodiment. The operation of the step-up DC-DC converter 22 is also the same as the operation of the step-up DC-DC converter 22 in the first embodiment. The step-up DC-DC converter 22 can output a voltage of an arbitrary value by the control signal θ output from the control device 4C. In order to prevent the current received from the commercial power source 100 by the power factor correction device 2 from exceeding the upper limit value, the wireless power transfer facility 1C according to the second embodiment may have a function of using auxiliary power and a function of adjusting the output voltage. The following description will be given on the assumption that the wireless power transfer facility 1C according to the second embodiment has a function of using auxiliary power and a function of adjusting the output voltage.

The function of adjusting the output voltage may be additionally provided as needed. The wireless power transfer facility 1C according to the second embodiment may use only the auxiliary power function in order to prevent the current from exceeding the upper limit value. In this case, the step-up DC-DC converter 22 always outputs a constant voltage. The step-up DC-DC converter 22 does not adjust the voltage according to the control signal θ. Therefore, it is not necessary to set the voltage output from the step-up DC-DC converter 22 each time. As a result, in the control device 4C, the voltage control unit 4c can be omitted.

At least one of the plurality of wireless power transfer devices 3 has a function of receiving the power output from the power feeding target 200C. At least one of the plurality of wireless power transfer devices 3 can receive the power charged in the battery of the power feeding target 200C. The power feeding target 200C has not only a function of receiving the power through the coil but also a function of outputting the power through the coil. The power feeding target 200C has a power transmission and reception coil 204 through which power transmission and power reception are possible. Therefore, the "auxiliary power" in the second embodiment means the power charged in the battery of the power feeding target 200C. Then, the wireless power transfer device 3C having a function of receiving the power output from the power feeding target 200C can output auxiliary power to another wireless power transfer device 3. Therefore, the wireless power transfer device 3C is also an auxiliary power output unit. The power received by the wireless power transfer device 3 that performs a power transmission operation is the sum of the power output from the power factor correction device 2 and the power output from the wireless power transfer device 3C that functions as an auxiliary power output unit.

The wireless power transfer device 3C that functions as an auxiliary power output unit includes a bidirectional inverter 38 and a power transmission and reception coil 39. The bidirectional inverter 38 receives the control signal θ and converts the AC power received from the power transmission and reception coil 39 into DC power. The bidirectional inverter 38 outputs the power as auxiliary power to the wireless power transfer device 3 that performs a power transmission operation.

The control device 4C controls the power factor correction device 2 and the wireless power transfer device 3C, which functions as an auxiliary power output unit, so that the value of the ammeter 92 does not exceed the upper limit value. The operation flow of the control device 4C will be described. Next, the functional configuration of the control device 4C for realizing the operation flow will be described.

Figure 10:
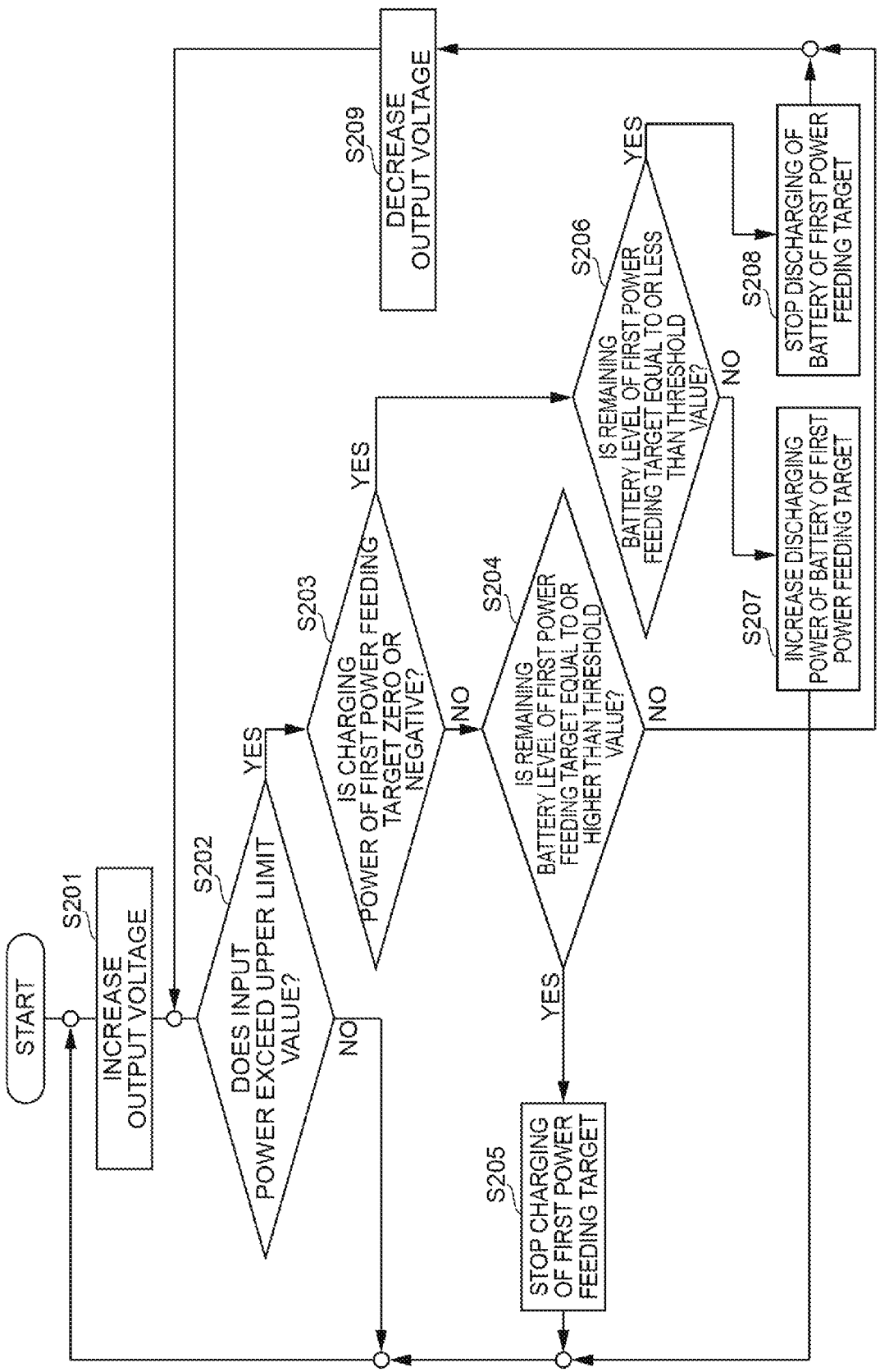
FIG. 10 is a flowchart showing the operation of a control device provided in the wireless power transfer facility according to the second embodiment.

FIG. 10 is a flowchart showing the operation of the control device 4C.

The control device 4C outputs a control signal θ for increasing the output voltage by the amount of increase (step S201). The details of step S201 are the same as those of step S101 described in the first embodiment.

The control device 4C compares the input current with the upper limit value (step S202). The details of step S202 are also the same as those of step S102 described in the first embodiment.

When it is determined in step S202 that the input current does not exceed the upper limit value (step S202: NO), the control device 4C outputs a control signal θ for increasing the output voltage (step S201). When the input current does not exceed the upper limit value, the control device 4C repeats the comparison between the input current and the upper limit value (step S202) and the output of the control signal θ for increasing the output voltage (step S201). According to this repetition, when the input current does not exceed the upper limit value, the output voltage gradually increases.

When it is determined in step S202 that the input current exceeds the upper limit value (step S202: YES), the control device 4C determines the state of the battery 203 of the power feeding target 200C receiving the power transmitted from the wireless power transfer device 3C that functions as an auxiliary power output unit (step S203). Specifically, it is determined whether or not the state of the battery 203 of the power feeding target 200C receiving the transmitted power corresponds to either a state in which charging is stopped or a discharging state. The control device 4C may obtain the information φ for determining the state of the battery 203 from the power feeding target 200C. The control device 4C may obtain the information φ for determining the state of the battery 203 from the wireless power transfer device 3C that functions as an auxiliary power output unit.

In the determination performed in step S203, when the power stored in the battery 203 of the power feeding target 200C receiving the transmitted power does not change with the passage of time, it can be determined that the charging and discharging of the battery 203 are stopped (charge and discharge stop state). When the power stored in the battery 203 decreases with the passage of time, it can be determined that the battery 203 is being discharged (discharge state). When the state of the battery 203 corresponds to neither the charge and discharge stop state nor the discharge state, the state of the battery 203 is a charge state.

When the state of the battery 203 does not correspond to the charge and discharge stop state and the discharge state in step S203 (step S203: NO), step S204 is executed. When the state of the battery 203 does not correspond to the charge and discharge stop state and the discharge state, the battery 203 is in a charge state. In step S204, the control device 4C evaluates the amount of power stored in the battery 203 of the power feeding target 200C receiving the transmitted power. The control device 4C evaluates the remaining battery level. Specifically, the control device 4C obtains the information φ regarding the remaining battery level from the power feeding target 200C. Then, the control device 4C compares the remaining battery level with the threshold value. Assuming that the power at the time of full charge is a remaining battery level of 100%, 90% may be adopted as a threshold value.

When the remaining battery level is equal to or higher than the threshold value (90%) as a result of the comparison in step S204 (step S204: YES), step S205 is executed. When the remaining battery level is equal to or higher than the threshold value (90%), it is determined that the charging operation may be temporarily stopped. In step S205, a control signal θ for stopping the power transmission is output to the wireless power transfer device 3C that is transmitting the power required for charging the battery 203. Then, step S201 for increasing the output voltage is executed again.

When the charging of the battery 203 is stopped, the power that can be output to another wireless power transfer device 3 increases. Therefore, this can contribute to reducing the power output to the power factor correction device 2. That is, if the charging of the battery 203 having a large amount of charge is temporarily stopped, the power output to the battery 203 can be used to charge another battery 203 having a small amount of charge. Even when the power output to the battery 203 having a large amount of charge is used for charging another battery 203, it can be said that the power used for the charging is auxiliary power.

When the remaining battery level is not equal to or higher than the threshold value (90%) as a result of the comparison in step S204 (step S204: NO), step S209 is executed. When the remaining battery level is not equal to or higher than the threshold value (90%), it is determined that the charging operation is continued. In this case, the input current to the power factor correction device 2 is reduced by decreasing the output voltage of the power factor correction device 2. Therefore, the control device 4C outputs a control signal θ for decreasing the output voltage to the power factor correction device 2 (step S209). Then, step S202 for comparing the input current with the upper limit value is executed again.

Up to now, the case where the result of step S203 is NO has been described. Next, a case where the result of step S203 is YES will be described. That is, a case where the battery 203 corresponds to either the charge and discharge stop state or the discharge state will be described.

When the battery 203 corresponds to either the charge and discharge stop state or the discharge state in step S203 (step S203: YES), step S206 is executed. In step S206, the control device 4C evaluates the amount of power stored in the battery 203 of the power feeding target 200C receiving the transmitted power. In step S206, assuming that the power at the time of full charge is a remaining battery level of 100%, 80% may be adopted as a threshold value. In the previous step S204, 90% was exemplified as a threshold value. That is, as a threshold value used in step S206, a value smaller than the threshold value used in step S204 may be adopted.

When the remaining battery level is equal to or less than the threshold value (80% or less) as a result of the comparison in step S206 (step S206: YES), step S208 is executed. In step S208, the control device 4C outputs a control signal θ for stopping the discharging of the battery 203 to the wireless power transfer device 3C. For example, the operation of the bidirectional inverter 38 is stopped by the control signal θ. When the state of the battery 203 is a charge and discharge stop state or a discharge state and the remaining battery level is equal to or higher than the threshold value (80%), it is determined that the power stored in the battery 203 should be maintained. After executing step S209 for decreasing the output voltage, step S202 for comparing the input current with the upper limit value is executed again.

When the remaining battery level is not equal to or less than the threshold value (80%) as a result of the comparison in step S206 (step S206: NO), step S207 is executed. In step S207, the control device 4C outputs a control signal θ for discharging the power from the battery 203 to the wireless power transfer device 3C and the power feeding target 200C. For example, the output of power from the bidirectional inverter 38 to another wireless power transfer device 3 is started. When the state of the battery 203 is a charge and discharge stop state or a discharge state and the remaining battery level is not equal to or less than the threshold value (80%), it is determined that the battery 203 is in a state where power is stored to some extent. Then, step S201 for increasing the output voltage is executed again.

As shown in FIG. 9, the control device 4C has a functional component for realizing the above operation. The control device 4C includes a data acquisition unit 4a, an input current determination unit 4b, and a voltage control unit 4c. The control device 4C includes a state determination unit 4e, a remaining battery level determination unit 4f, and a charge and discharge control unit 4g. The functions performed by these elements are realized by the CPU executing a program.

The configurations and operations of the data acquisition unit 4a, the input current determination unit 4b, and the voltage control unit 4c are the same as those in the first embodiment. Therefore, detailed description thereof will be omitted.

The state determination unit 4e determines whether the battery 203 is in a charge and discharge stop state or a discharge state. The state determination unit 4e executes step S203. The state determination unit 4e may obtain information required for the determination from the power feeding target 200C. The state determination unit 4e may obtain the information required for the determination from the wireless power transfer device 3C. For example, when the wireless power transfer device 3C does not transmit power and does not receive power, it may be determined that the battery 203 is in a charge and discharge stop state. For example, when the wireless power transfer device 3C receives power, it may be determined that the battery 203 is in a discharge state. The state determination unit 4e outputs either a result that the battery 203 is in a charge and discharge stop state or a result that the battery 203 is in a discharge state.

The remaining battery level determination unit 4f evaluates the remaining battery level of the battery 203. The remaining battery level determination unit 4f performs the operations of steps S204 and S206. The remaining battery level determination unit 4f holds in advance the threshold value used in step S204 and the threshold value used in step S206. The remaining battery level determination unit 4f outputs one of a result that the remaining battery level is equal to or higher than the threshold value, a result that the remaining battery level is not equal to or higher than the threshold value, a result that the remaining battery level is equal to or less than the threshold value, and a result that the remaining battery level is not equal to or less than the threshold value.

The charge and discharge control unit 4g sets the state of the battery 203 to one of the charge and discharge stop state, the discharge state, and the charge state. When the state of the battery 203 is set to the discharge state, the amount of power to be discharged is also set. The charge and discharge control unit 4g performs the operations of steps S205, S207, and S208.

Description of Operation Example

An operation example of the wireless power transfer facility 1C will be described with reference to FIGS. 11A to 11F. Prerequisites for the operation example are the same as those for the operation example described in the first embodiment. Therefore, the presentation of the detailed prerequisites will be omitted.

Figure 11A:
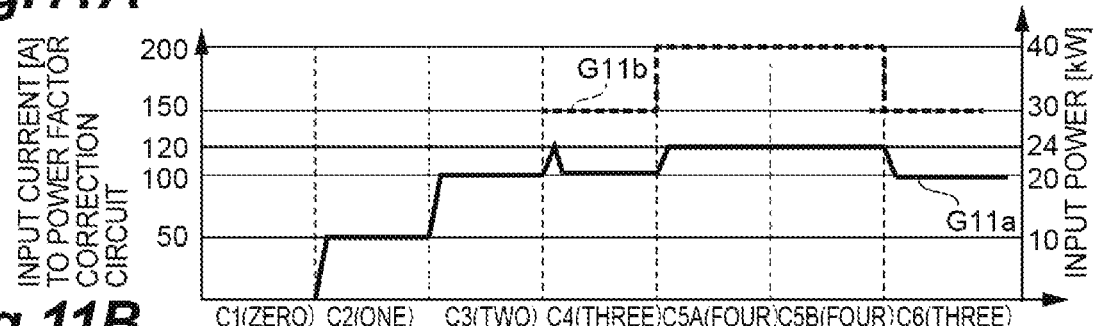
FIGS. 11A to 11F are charts for explaining an operation example of the wireless power transfer facility according to the second embodiment.
Figure 11B:
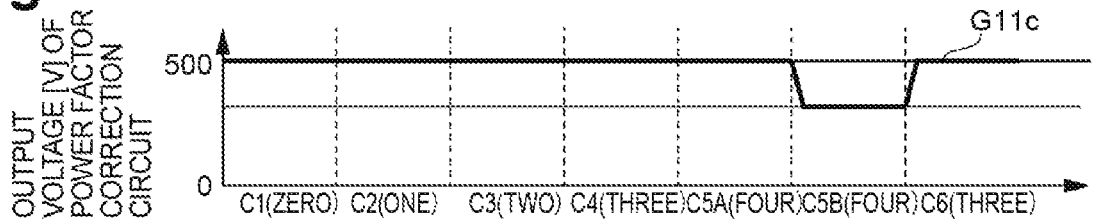
Figure 11C:
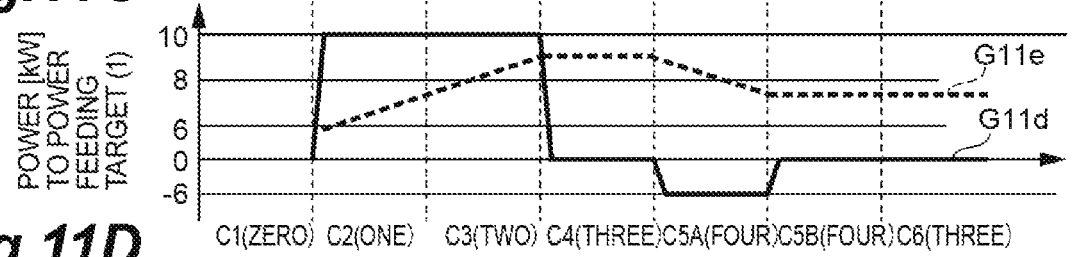
Figure 11D:
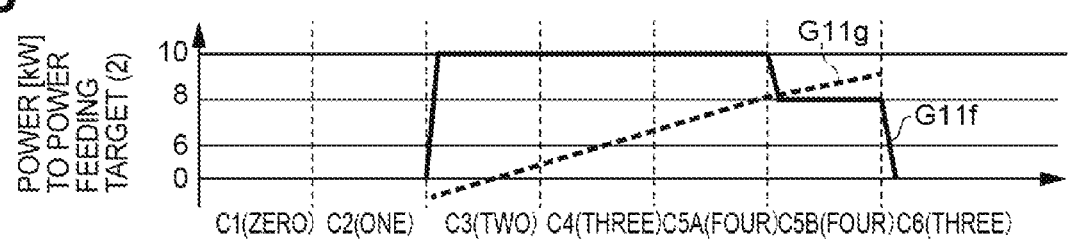
Figure 11E:
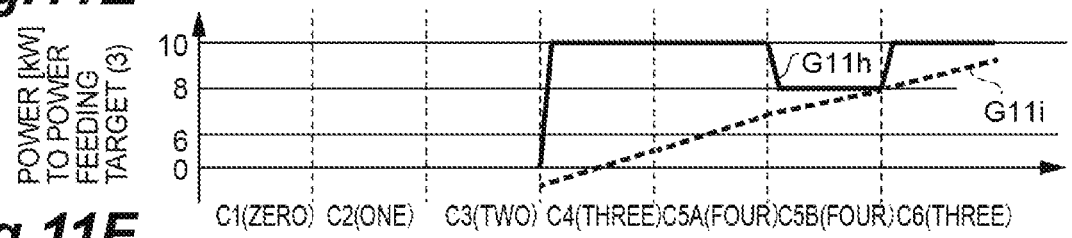
Figure 11F:
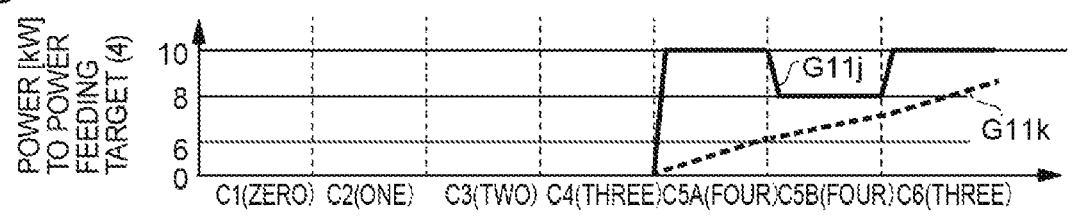

FIG. 11A shows an input current (graph G11a) output from the commercial power source 100 to the power factor correction device 2. FIG. 11B shows an output voltage (graph G11c) output from the power factor correction device 2. FIG. 11C shows power (graph G11d) output to the first power feeding target 200 and the remaining battery level (graph G11e) of the power feeding target 200. FIG. 11D shows power (graph G11f) output to the second power feeding target 200 and the remaining battery level (graph G11g) of the power feeding target 200. FIG. 11E shows power (graph G11h) output to the third power feeding target 200 and the remaining battery level (graph G11i) of the power feeding target 200. FIG. 11F shows power (graph G11j) output to the fourth power feeding target 200 and the remaining battery level (graph G11k) of the power feeding target 200.

Operations when the number of power feeding targets 200 is zero (state C1), when the number of power feeding targets 200 increases from zero to one (state C1), and when the number of power feeding targets 200 increases from one to two (state C3) are the same as the operations described in the first embodiment. Therefore, detailed description of the states C1, C2, and C3 will be omitted.

<When the Number of Power Feeding Targets Increases from Two to Three: State C4>

The control device 4C determines that the input current exceeds the upper limit value (step S202: YES). Then, the input current determination unit 4b of the control device 4C determines the state of the first power feeding target 200 (step S203). Now, the first power feeding target 200 is in a charge state. Therefore, the state determination unit 4e of the control device 4C outputs a result that the state of the first power feeding target 200 does not correspond to the charge and discharge stop state and does not correspond to the discharge state (step S203: NO). Then, the remaining battery level determination unit 4f of the control device 4C evaluates the remaining battery level of the first power feeding target 200. It is assumed that, at the point in time of determination, the remaining battery level of the first power feeding target 200 is 95%. As a result, the remaining battery level determination unit 4f of the control device 4C evaluates that the remaining battery level of the first power feeding target 200 is equal to or higher than the threshold value (90%) (step S204: YES). Then, the charge and discharge control unit 4g of the control device 4C stops power transmission to the first power feeding target 200 (step S205). As a result, although there are three power feeding targets 200 that require power transmission, only the second and third power feeding targets 200 can actually receive the power transmitted from the wireless power transfer device 3. Therefore, the power received by the first power feeding target 200 is 0 kW. The power received by each of the second and third power feeding targets 200 is 10 kW. It is not necessary to decrease the output voltage of the power factor correction device 2. Therefore, the output voltage of the power factor correction device 2 can be maintained at 500 V. The input current can be suppressed to 100 A.

<When the Number of Power Feeding Targets Increases from Three to Four (Case 1): State C5A>

It is assumed that the fourth power feeding target 200 is further added in a state in which the power received by each of the second and third power feeding targets 200 is 10 kW.

The control device 4C determines that the input current exceeds the upper limit value (step S202: YES). Then, the input current determination unit 4b of the control device 4C determines the state of the first power feeding target 200 (step S203). Now, the first power feeding target 200 is in a charge and discharge stop state. Therefore, the state determination unit 4e of the control device 4C outputs a result that the state of the first power feeding target 200 corresponds to the charge and discharge stop state (step S203: YES). Then, the remaining battery level determination unit 4f of the control device 4C evaluates the remaining battery level of the first power feeding target 200. Since the first power feeding target 200 is in the charge and discharge stop state, the remaining battery level does not increase or decrease. Therefore, at the point in time of determination, the remaining battery level of the first power feeding target 200 is 95%. The remaining battery level determination unit 4f of the control device 4C evaluates that the remaining battery level of the first power feeding target 200 is not equal to or less than the threshold value (80%) (step S206: NO). As a result, the charge and discharge control unit 4g of the control device 4C starts the discharging of the first power feeding target 200 (step S207). In this case, the control device 4C discharges the insufficient power in power transmission to the three power feeding targets 200.

For example, it is assumed that the power of 10 kW is simultaneously output to each of the three power feeding targets 200. In this case, the required power is 30 kW. On the other hand, the maximum value of the power received from the commercial power source 100 is 24 k in the present embodiment. That is, a power shortage of 6 kW occurs. In the first embodiment, control to share the power received from the commercial power source 100 is performed. Therefore, when charging the three power feeding targets 200 with 24 k, the power output to each of the three power feeding targets 200 is set to 8 kW by decreasing the output voltage of the power factor correction device 2. On the other hand, in the second embodiment, auxiliary power can be used. That is, insufficient power of 6 kW is obtained from the first power feeding target 200 that has already stored sufficient power. As a result, the power of 30 kW required to simultaneously output the power of 10 kW to each of the three power feeding targets 200 can be covered by 24 k output from the commercial power source 100 and 6 kW output from the first power feeding target 200.

By the above operation, in the state C5A, the first power feeding target 200 can output (discharge) the power of 6 kW. Each of the second, third, and fourth power feeding targets 200 can receive the power of 10 kW. In this case, it is not necessary to decrease the output voltage of the power factor correction device 2, so that the output voltage of the power factor correction device 2 can be maintained at 500 V. The input current can be suppressed to 120 A.

<When the Number of Power Feeding Targets Increases from Three to Four (Case 2): State C5B>

When the state C5A continues, the remaining battery level of the first power feeding target 200 decreases with the passage of time. First, after a predetermined period of time has passed, a state in which it is evaluated that the remaining battery level of the first power feeding target 200 is not equal to or less than the threshold value (80%) (step S207: NO) is switched to a state in which it is evaluated that the remaining battery level of the first power feeding target 200 is equal to or less than the threshold value (80%) (step S206: YES). As described above, the state in which it is evaluated that the remaining battery level is not equal to or less than the threshold value (80%) (step S207: NO) is the state CSA. The state in which it is evaluated that the remaining battery level is equal to or less than the threshold value (80%) (step S206: YES) is the state CSB.

The control device 4C determines that the input current exceeds the upper limit value (step S202: YES). Then, the input current determination unit 4b of the control device 4C determines the state of the first power feeding target 200 (step S203). Now, the first power feeding target 200 is in a discharge state. Therefore, the state determination unit 4e of the control device 4C outputs a result that the state of the first power feeding target 200 corresponds to the discharge state (step S203: YES). Then, the remaining battery level determination unit 4f of the control device 4C evaluates the remaining battery level of the first power feeding target 200. Since the first power feeding target 200 is in a discharge state, the remaining battery level decreases with the passage of time. Therefore, at the point in time of determination, it is assumed that the remaining battery level of the first power feeding target 200 is 80%. The remaining battery level determination unit 4f of the control device 4C evaluates that the remaining battery level of the first power feeding target 200 is equal to or less than the threshold value (80%) (step S206: YES). As a result, the charge and discharge control unit 4g of the control device 4C stops the discharging of the first power feeding target 200 (step S208).

When the discharging of the first power feeding target 200 is stopped, the auxiliary power of 6 kW is not output from the first power feeding target 200. Therefore, the three power feeding targets 200 share the power of 24 k output from the commercial power source 100. Therefore, the voltage control unit 4c of the control device 4C decreases the output voltage of the power factor correction device 2 (step S209). Then, step S202 for comparing the input current with the upper limit value is executed again.

<When the Number of Power Feeding Targets Decreases from Four to Three: State C6>

It is assumed that the charging of the second power feeding target 200 is completed. As a result, the number of power feeding targets 200 decreases from four to three. Charging and discharging of the first power feeding target 200 are stopped. Therefore, the actual power feeding targets 200 are the third and fourth power feeding targets 200. When there are two power feeding targets 200, the required power can be covered by the power of 24 k from the commercial power source 100. The input current determination unit 4b of the control device 4C outputs a result that the input current does not exceed the upper limit value as a result of the comparison in step S202 (step S202: NO). The output voltage of the power factor correction device 2, which is stepped down to a voltage lower than 500 V, is increased (step S201). By repeating the above operation, the output voltage of the power factor correction device 2 finally reaches 500 V. In this state, the power received by each of the third and fourth power feeding targets 200 is 10 kW.

Operational Effect

Similar to the wireless power transfer facility 1 according to the first embodiment, the wireless power transfer facility 1C according to the second embodiment can also be managed so that the power consumption does not exceed the upper limit with a simple configuration.

The wireless power transfer facility 1C according to the second embodiment includes the wireless power transfer device 3C that functions as an auxiliary power output unit that outputs auxiliary power. The control device 4C controls the wireless power transfer device 3C that functions as an auxiliary power output unit. According to this configuration, the insufficient power can be covered by the auxiliary power output from the wireless power transfer device 3C that functions as an auxiliary power output unit.

In the wireless power transfer facility 1C according to the second embodiment, the bidirectional inverter 38 can be used as an auxiliary power output unit. Therefore, it is not necessary to additionally provide a component as an auxiliary power output unit. As a result, the configuration of the wireless power transfer facility 1C can be simplified.

Third Embodiment

FIG. 12 shows a wireless power transfer facility 1D according to a third embodiment. In the wireless power transfer facility 1C according to the second embodiment, the power stored in the power feeding target 200C is used as auxiliary power. In the wireless power transfer facility 1D according to the third embodiment, the power stored in a stationary battery device 6 is used as auxiliary power.

The wireless power transfer facility 1D includes one power factor correction device 2, a plurality of wireless power transfer devices 3, one control device 4D, and a stationary battery device 6. The configurations and operations of the power factor correction device 2 and the wireless power transfer device 3 are the same as those in the first embodiment. Therefore, detailed description of the power factor correction device 2 and the wireless power transfer device 3 will be omitted. Similar to the second embodiment, the function of adjusting the output voltage of the step-up DC-DC converter 22 provided in the power factor correction device 2 may be additionally provided as needed.

Figure 13:
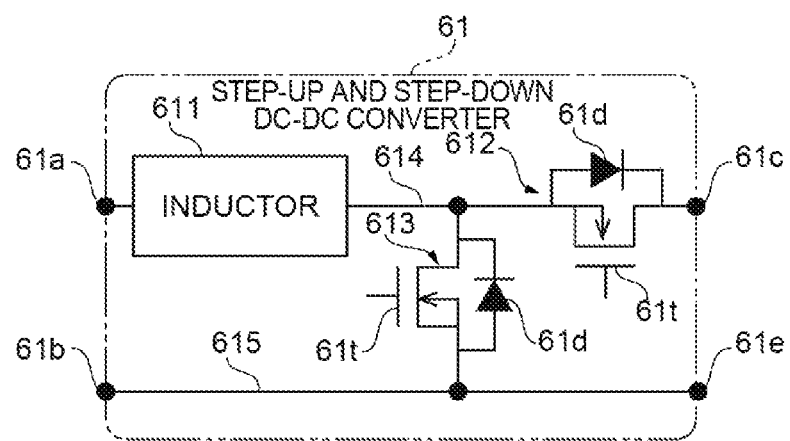
FIG. 13 is an example of a step-up and step-down DC-DC converter shown in FIG. 12.

The battery device 6 includes a step-up and step-down DC-DC converter 61 and a stationary battery 62. The stationary battery 62 may be installed in a corner of a parking lot where the wireless power transfer device 3 is arranged. The step-up and step-down DC-DC converter 61 is connected to the power factor correction device 2. The step-up and step-down DC-DC converter 61 is also connected to a plurality of wireless power transfer devices 3. An ammeter 95 may be provided at the output of the step-up and step-down DC-DC converter 61. The step-up and step-down DC-DC converter 61 transforms the output voltage of the power factor correction device 2 into a voltage at which the stationary battery 62 can be charged. This transformation may be step-up or step-down. The step-up and step-down DC-DC converter 61 transforms the DC voltage output from the stationary battery 62 into the DC voltage required by the inverter 31. This transformation may be step-up or step-down. As the step-up and step-down DC-DC converter 61, a circuit shown in FIG. 13 may be used.

The step-up and step-down DC-DC converter 61 includes an inductor 611 and two switch function units 612 and 613. Each of the switch function units 612 and 613 has a transistor 61t and a diode 61d. The transistor 61t and the diode 61d are connected in parallel with each other. The inductor 611 and the switch function unit 612 are arranged between a first input 61a and a first output 61c of the step-up and step-down DC-DC converter 61. The inductor 611 is connected to the first input 61a. The switch function unit 612 is connected to the first output 61c. The inductor 611 and the switch function unit 612 are connected in series with each other by a wiring 614. A second input 61b of the step-up and step-down DC-DC converter 61 is connected to a second output 61e by a wiring 615. The switch function unit 613 is arranged between the wiring 614 for connecting the inductor 611 to the switch function unit 612 and the wiring 615 for connecting the second input 61b to the second output 61e.

Figure 14:
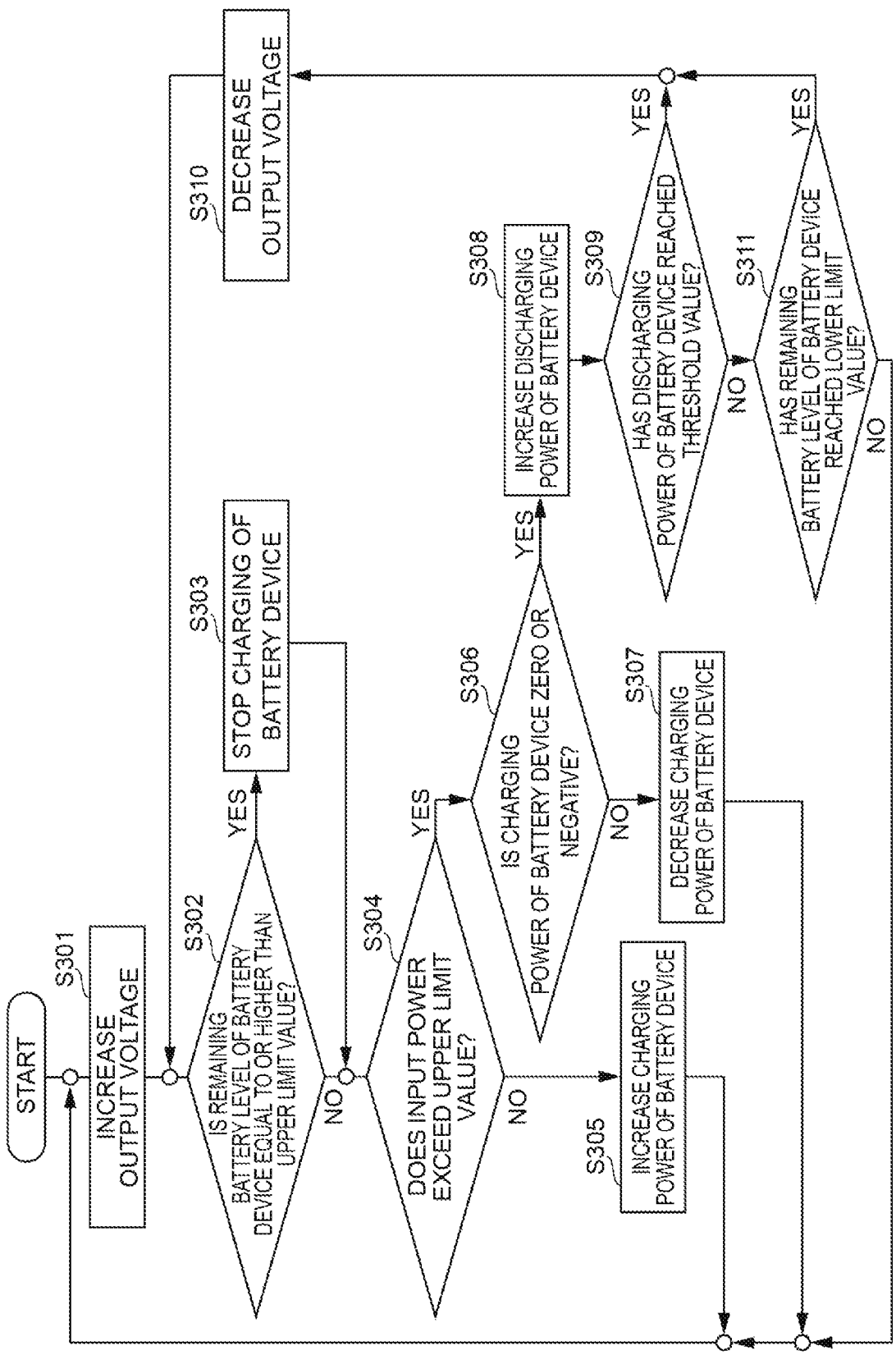
FIG. 14 is a flowchart showing the operation of a control device provided in the wireless power transfer facility according to the third embodiment.

The control device 4D controls the power factor correction device 2 and the battery device 6 so that the value of the ammeter 92 does not exceed the upper limit value. The operation flow of the control device 4D shown in FIG. 14 will be described. Next, the functional configuration of the control device 4D for realizing the operation flow will be described.

When the operation starts, the control device 4D outputs a control signal θ for starting the charging operation of the battery device 6. When the power is input, the battery device 6 that has received the control signal θ is in a state in which the battery device 6 can be charged with the input power.

The control device 4D increases the output voltage (step S301). The details of this step S301 are the same as those of step S101 described in the first embodiment.

Then, the control device 4D checks the remaining battery level of the battery device 6 (step S302). Specifically, the control device 4D determines whether or not the remaining battery level of the battery device 6 is equal to or higher than the upper limit value. When the remaining battery level of the battery device 6 is sufficient, it is not necessary to store more power. When the remaining battery level of the battery device 6 is equal to or higher than the upper limit value (step S302: YES), the control device 4D outputs a control signal θ for stopping the charging of the battery device 6 (step S303). Then, the control device 4D compares the input current with the upper limit value (step S304).

On the other hand, when the remaining battery level of the battery device 6 is not sufficient, it is necessary to store power. At the start of operation, the battery device 6 is in a rechargeable state. Therefore, when the remaining battery level of the battery device 6 is not equal to or higher than the upper limit value (step S302: NO), the control device 4D maintains the charge state of the battery device 6. For example, the control device 4D may output a control signal θ for maintaining the charge state. The control device 4D may not output the control signal θ. Then, the control device 4D compares the input current with the upper limit value (step S304).

The control device 4D compares the input current with the upper limit value (step S304). The details of step S304 are the same as those of step S102 described in the first embodiment.

When it is determined in step S304 that the input current does not exceed the upper limit value (step S304: NO), the power output from the commercial power source 100 is larger than the power output from the power factor correction device 2. There is a surplus in the power output from the commercial power source 100. The surplus power is charged to the battery device 6. The control device 4D outputs a control signal θ for increasing the charging power of the battery device 6 (step S305). In the battery device 6 that has received the control signal θ, the step-up and step-down DC-DC converter 61 transforms the output voltage output from the power factor correction device 2 into the rechargeable voltage of the stationary battery 62. The stationary battery 62 receives the power output from the step-up and step-down DC-DC converter 61. The stationary battery 62 is charged by the power received from the step-up and step-down DC-DC converter 61.

Subsequently, the control device 4D outputs a control signal θ for increasing the output voltage again (step S305). When the remaining battery level of the battery device 6 is equal to or less than the upper limit value (step S302: NO) and the input current does not exceed the upper limit value (step S304: NO), the control device 4D repeats step S305 for increasing output voltage, step S302 for checking the remaining battery level of the battery device 6, step S304 for comparing the input current with the upper limit value, and step S305 for increasing the charging voltage of the battery device 6. According to this repetition, when the input current does not exceed the upper limit value, the output voltage gradually increases. According to this repetition, when the input current does not exceed the upper limit, the charging voltage also gradually increases.

When it is determined in step S304 that the input current exceeds the upper limit value (step S304: YES), the power output from the commercial power source 100 is less than the power output from the power factor correction device 2. At this time, the power output from the power factor correction device 2 is used for charging the power feeding target 200 and charging the battery device 6. Then, the state in which the power output from the commercial power source 100 is less than the power output from the power factor correction device 2 may be resolved by adjusting the power output to the battery device 6. The control device 4D checks the operating state of the battery device 6 (step S306). Specifically, the control device 4D determines whether the operating state of the battery device 6 corresponds to the charge and discharge stop state or the discharge state.

When the battery device 6 does not correspond to the charge and discharge stop state in step S306, the battery device 6 is in the charge state. Even when the battery device 6 does not correspond to the discharge state in step S306, the battery device 6 is in the charge state. In these cases, the control device 4D outputs a control signal θ for decreasing the charging power of the battery device 6 (step S307). Then, the control device 4D outputs a control signal θ for increasing the output voltage again.

When the battery device 6 corresponds to the charge and discharge stop state in step S306, the control device 4D outputs a control signal θ for the operation (discharge) of outputting power from the battery device 6 (step S308). When the battery device 6 corresponds to the discharge state in step S306, the control device 4D outputs a control signal θ for increasing the discharging power of the battery device 6 (step S308).

Then, the control device 4D checks the discharge state of the battery device 6 (step S309). Specifically, it is determined whether or not the discharging power of the battery device 6 has reached the limit value of the power that the battery device 6 can discharge. When the discharging power of the battery device 6 has not reached the limit value, it may be possible to further increase the discharging power. That is, there is a possibility that the auxiliary power can be further increased. As a result, it may be possible to resolve the state in which the input current exceeds the upper limit. On the other hand, when the discharging power of the battery device 6 has reached the limit value, the auxiliary power cannot be further increased. Therefore, it is necessary to resolve the state in which the input current exceeds the upper limit value by decreasing the output voltage of the power factor correction device 2 instead of increasing the auxiliary power.

When the discharging power of the battery device 6 has reached the limit value in step S309 (step S309: YES), the control device 4D outputs a control signal θ for decreasing the output voltage of the power factor correction device 2 (step S310). Then, the control device 4D executes the operation flow again in order from step S302 for checking the remaining battery level of the battery device 6.

As described above, when the discharging power of the battery device 6 has not reached the limit value in step S309 (step S309: NO), there is a possibility that the discharging power can be further increased. However, even if there is a margin in terms of the output capacity of the battery device 6, when the remaining battery level is low, the power cannot be output from the battery device 6 as auxiliary power. Therefore, the control device 4D checks the remaining battery level of the battery device 6 (step S311). Specifically, the control device 4D determines whether or not the remaining battery level of the stationary battery 62 has reached the lower limit value. Assuming that the full charge state is 100%, the lower limit value may be, for example, 0%.

When the remaining battery level of the battery device 6 has not reached 0% in step S311 (step S311: NO), the power discharged by the battery device 6 can be further increased. Therefore, the control device 4D executes the operation flow again in order from step S301 for increasing the output voltage of the power factor correction device 2.

When the remaining battery level of the battery device 6 has reached 0% in step S311 (step S311: YES), no power can already be discharged from the battery device 6. The control device 4D outputs a control signal θ for decreasing the output voltage of the power factor correction device 2 (step S310). The control device 4D executes the operation flow again in order from step S302 for checking the remaining battery level of the battery device 6.

As shown in FIG. 12, the control device 4D has a functional component for realizing the above operation. The control device 4 includes the data acquisition unit 4a, the input current determination unit 4b, and the voltage control unit 4c. The control device 4D includes a state determination unit 4h, a discharge amount determination unit 4k, a remaining battery level determination unit 4m, and a charge and discharge control unit 4n. The functions performed by these functional components are realized by the CPU executing a program.

Since the configurations and operations of the data acquisition unit 4a, the input current determination unit 4b, and the voltage control unit 4c are the same as those in the first embodiment, detailed description thereof will be omitted.

The state determination unit 4h determines whether the battery device 6 is in a charge and discharge stop state or a discharge state. The state determination unit 4h executes step S306. The state determination unit 4h obtains the information required for the determination from the battery device 6. The state determination unit 4h outputs either a result that the battery device 6 is in a charge and discharge stop state or a result that the battery device 6 is in a discharge state.

The discharge amount determination unit 4k determines whether or not the discharging power of the battery device 6 has reached the limit value. The discharge amount determination unit 4k performs the operation of step S309. The discharge amount determination unit 4k holds in advance the limit value used in step S309. The discharge amount determination unit 4k outputs either a result that the discharging power has reached the limit value or a result that the discharging power has not reached the limit value.

The remaining battery level determination unit 4m evaluates the remaining battery level of the battery device 6. The remaining battery level determination unit 4m performs the operation of step S311. The remaining battery level determination unit 4m holds in advance the lower limit value used in step S311. The remaining battery level determination unit 4m outputs either a result that the remaining battery level has reached the lower limit value or a result that the remaining battery level has not reached the lower limit value.

The charge and discharge control unit 4n sets the state of the battery device 6 to one of the charge and discharge stop state, the discharge state, and the charge state. When the state of the battery device 6 is set to the discharge state, the amount of power to be discharged is also set. The charge and discharge control unit 4n performs the operations of steps S303, S305, and S307.

Description of Operation Example

Next, an operation example of the wireless power transfer facility 1D will be described with reference to FIGS. 15A to 15G. Prerequisites for the operation example are the same as those for the operation example described in the first embodiment. Therefore, the presentation of the detailed prerequisites will be omitted. In addition, it is assumed that the remaining battery level of the battery device 6 is 0% at the start of the operation example.

Figure 15A:
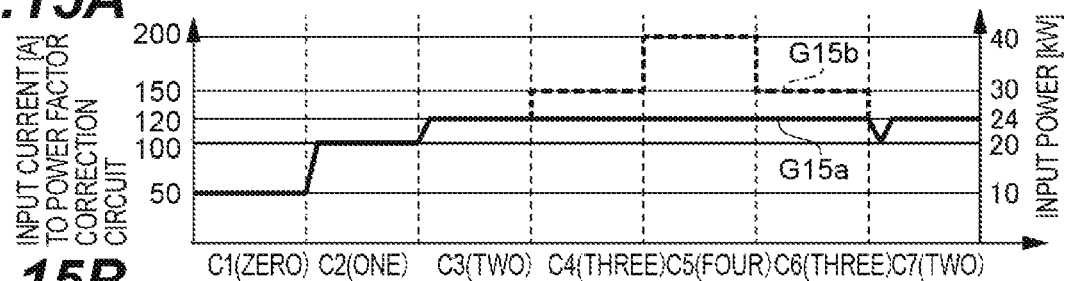
FIGS. 15A to 15G are charts for explaining an operation example of the wireless power transfer facility according to the third embodiment.
Figure 15B:
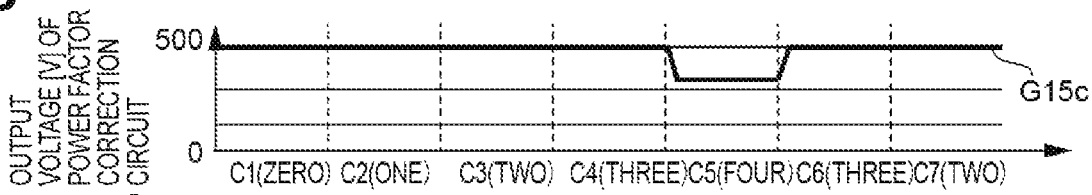
Figure 15C:
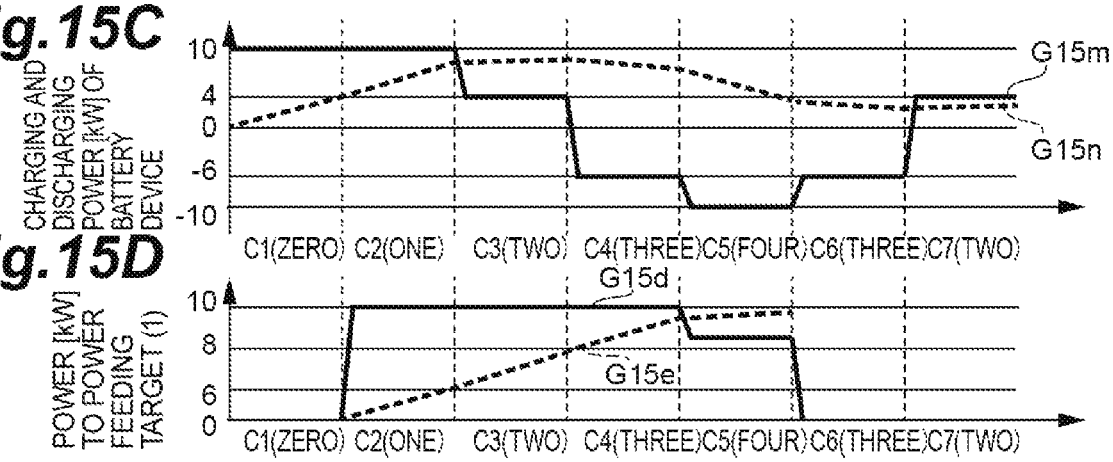
Figure 15D:
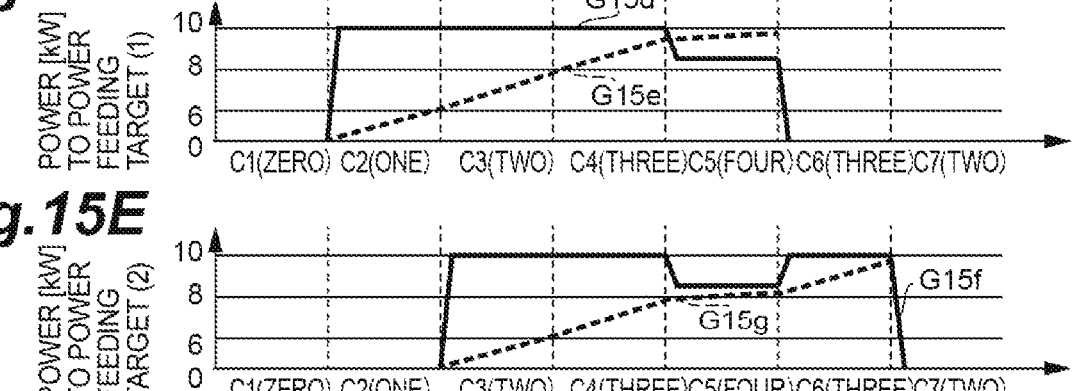
Figure 15E:
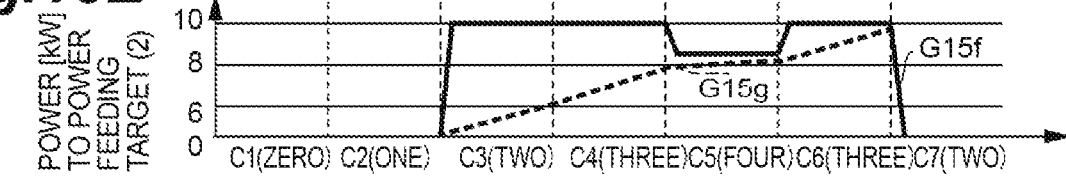
Figure 15F:
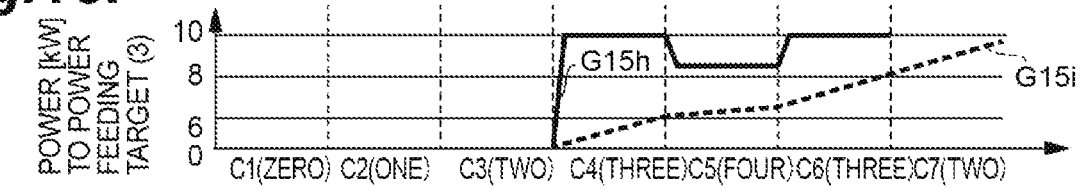
Figure 15G:
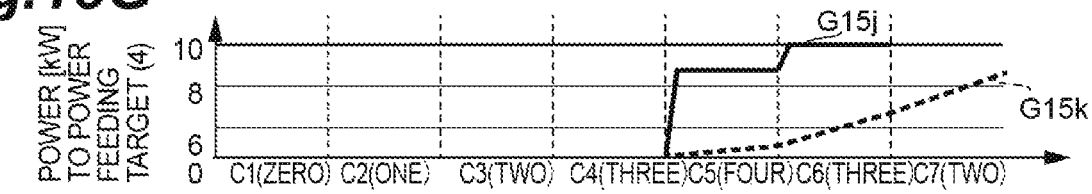

FIG. 15A shows an input current (graph G15a) output from the commercial power source 100 to the power factor correction device 2. FIG. 15B shows output power (graph G15c) output from the power factor correction device 2. FIG. 15C shows power (graph G15m) discharged from the battery device 6 and the remaining battery level (graph G15n) of the battery device 6. FIG. 15D shows power (graph G15d) output to the first power feeding target 200 and the remaining battery level (graph G15e) of the battery 203 of the power feeding target 200. FIG. 15E shows power (graph G15f) output to the second power feeding target 200 and the remaining battery level (graph G15g) of the battery 203 of the power feeding target 200. FIG. 15F shows power (graph G15h) output to the third power feeding target 200 and the remaining battery level (graph G15i) of the battery 203 of the power feeding target 200. FIG. 15G shows power (graph G15j) output to the fourth power feeding target 200 and the remaining battery level (graph G15k) of the battery 203 of the power feeding target 200.

<When the Number of Power Feeding Targets is Zero: State C1>

In the state C1, the states of the power factor correction device 2, the battery device 6, and the first to the fourth power feeding targets 200 are as follows.

Input current received by the power factor correction device 2: 50 A.

Input power received by the power factor correction device 2: 10 kW.

Output voltage of the power factor correction device 2: 500 V.

Charging or discharging power of the battery device 6: +10 kW (charging).

Power received by the first power feeding target 200: 0 kW.

Power received by the second power feeding target 200: 0 kW.

Power received by the third power feeding target 200: 0 kW.

Power received by the fourth power feeding target 200: 0 kW.

The remaining battery level determination unit 4m of the control device 4D checks the remaining battery level of the battery device 6 (step S302). At the start of the operation example, the remaining battery level of the battery device 6 is 0%. As a result, the remaining battery level determination unit 4m outputs a result that the remaining battery level of the battery device 6 is not the upper limit value (step S302: NO). Therefore, charging of the battery device 6 continues. Then, the input current determination unit 4b compares the input power with the upper limit value (step S304). Since the input current received by the power factor correction device 2 is 50 A, the input current determination unit 4b outputs a result that the input power (50 A) does not exceed the upper limit value (120 A) (step S304: NO). In the state C1, the operation including step S302 and step S304 is repeated.

<When the Number of Power Feeding Targets is One: State C2>

In the state C2, the states of the power factor correction device 2, the battery device 6, and the first to the fourth power feeding targets 200 are as follows.

Input current received by the power factor correction device 2: 100 A.

Input power received by the power factor correction device 2: 20 kW.

Output voltage of the power factor correction device 2: 500 V.

Charging or discharging power of the battery device 6: +10 kW (charging).

Power received by the first power feeding target 200: 10 kW.

Power received by the second power feeding target 200: 0 kW.

Power received by the third power feeding target 200: 0 kW.

Power received by the fourth power feeding target 200: 0 kW.

The remaining battery level determination unit 4m checks the remaining battery level of the battery device 6 (step S302). Although the remaining battery level of the battery device 6 has increased from the beginning, the remaining battery level of the battery device 6 has not yet exceeded the upper limit. As a result, the remaining battery level determination unit 4m outputs a result that the remaining battery level of the battery device 6 is not the upper limit value (step S302: NO). Therefore, even in the state C2, the charging of the battery device 6 is continued. Then, the input current determination unit 4b compares the input power with the upper limit value (step S304). At this point in time, the power of 10 kW is output to the battery device 6 and the power of 10 kW is output to the first power feeding target 200. As a result, the input current received by the power factor correction device 2 is 100 A. Therefore, the input current determination unit 4b outputs a result that the input current (100 A) does not exceed the upper limit value (120 A) (step S304: NO). Even in the state C2, the operation including step S302 and step S304 is repeated.

<When the Number of Power Feeding Targets is Two: State C3>

In the state C3, the states of the power factor correction device 2, the battery device 6, and the first to the fourth power feeding targets 200 are as follows.

Input current received by the power factor correction device 2: 120 A.

Input power received by the power factor correction device 2: 24 k.

Output voltage of the power factor correction device 2: 500 V.

Charging or discharging power of the battery device 6: +4 k (charging).

Power received by the first power feeding target 200: 10 kW.

Power received by the second power feeding target 200: 10 kW.

Power received by the third power feeding target 200: 0 kW.

Power received by the fourth power feeding target 200: 0 kW.

The remaining battery level determination unit 4m checks the remaining battery level of the battery device 6 (step S302). Although the remaining battery level of the battery device 6 has further increased, the remaining battery level of the battery device 6 has not yet exceeded the upper limit. As a result, the remaining battery level determination unit 4m outputs a result that the remaining battery level of the battery device 6 is not the upper limit value (step S302: NO). Therefore, even in the state C3, the charging of the battery device 6 is continued. Then, the input current determination unit 4b compares the input power with the upper limit value (step S304).

It is assumed that the power of 10 kW is output to the battery device 6 and the power of 10 kW is output to the first and second power feeding targets 200. According to this assumption, the input current received by the power factor correction device 2 is 150 A. Therefore, the input current determination unit 4b outputs a result that the input current (150 A) exceeds the upper limit value (120 A) (step S304: YES). Then, the state determination unit 4h determines the state of the battery device 6 (step S306). At this point in time, the battery device 6 is in a charge state. Therefore, the state determination unit 4h outputs a result that the state of the battery device 6 does not correspond to the charge and discharge stop state and does not correspond to the discharge state (step S306: NO). In other words, the state determination unit 4h outputs a result that the charging power of the battery device 6 is neither zero nor negative. Based on this result, the charge and discharge control unit 4n outputs a control signal θ for decreasing the charging power of the battery device 6 (step S307). By repeating the above operation, the charging power of the battery device 6 converges to 4 kW.

<When the Number of Power Feeding Targets is Three: State C4>

In the state C4, the states of the power factor correction device 2, the battery device 6, and the first to the fourth power feeding targets 200 are as follows.

Input current received by the power factor correction device 2: 120 A.

Input power received by the power factor correction device 2: 24 k.

Output voltage of the power factor correction device 2: 500 V.

Charging or discharging power of the battery device 6: −6 kW (discharging).

Power received by the first power feeding target 200: 10 kW.

Power received by the second power feeding target 200: 10 kW.

Power received by the third power feeding target 200: 10 kW.

Power received by the fourth power feeding target 200: 0 kW.

The remaining battery level determination unit 4m checks the remaining battery level of the battery device 6 (step S302). The remaining battery level of the battery device 6 is further increasing. However, the remaining battery level of the battery device 6 has not yet exceeded the upper limit value. As a result, the remaining battery level determination unit 4m outputs a result that the remaining battery level of the battery device 6 is not the upper limit value (step S302: NO). Therefore, even in the state C4, the charging of the battery device 6 is continued. Then, the input current determination unit 4b compares the input power with the upper limit value (step S304). Assuming that the power of 10 kW is output to the first, second, and third power feeding targets 200, the input current received by the power factor correction device 2 is 150 A. Therefore, the input current determination unit 4b outputs a result that the input current (150 A) exceeds the upper limit value (120 A) (step S304: YES). Then, the state determination unit 4h determines the state of the battery device 6 (step S306). Even at this point in time, the battery device 6 is in a charge state. Therefore, the state determination unit 4h outputs a result that the state of the battery device 6 does not correspond to the charge and discharge stop state and does not correspond to the discharge state (step S306: NO). Based on this result, the charge and discharge control unit 4n decreases the charging power of the battery device 6.

By repeating the above operation, the charging power of the battery device 6 gradually decreases. Then, the charging power of the battery device 6 reaches zero. It is assumed that the charging power of the battery device 6 is zero and the power of 10 kW is output to the first, second, and third power feeding targets 200. According to this assumption, the input current received by the power factor correction device 2 is 150 A. Therefore, the input current determination unit 4b outputs a result that the input current (150 A) exceeds the upper limit value (120 A) (step S304: YES). Then, the state determination unit 4h determines the state of the battery device 6 (step S306). At this point in time, the charging power of the battery device 6 is zero. Therefore, the state determination unit 4h outputs a result that the state of the battery device 6 corresponds to the charge and discharge stop state (step S306: YES). Based on this result, the charge and discharge control unit 4n outputs a control signal θ for increasing the discharging power of the battery device 6 (step S308). Then, the discharge amount determination unit 4k determines whether or not the power discharged by the battery device 6 has reached the limit value (10 kW) (step S309). At this point in time, since the battery device 6 has just started discharging, the power discharged by the battery device 6 has not reached the limit value. Therefore, the discharge amount determination unit 4k outputs a result that the discharging power of the battery device 6 has not reached the limit value (10 kW) (step S309: NO). Then, the remaining battery level determination unit 4m checks the remaining battery level of the battery device 6 (step S311). As described above, since the discharge has just started at this point in time, the remaining battery level of the battery device 6 is sufficient. As a result, the remaining battery level of the battery device 6 has not reached the lower limit value. Therefore, the remaining battery level determination unit 4m outputs a result that the remaining battery level has not reached the lower limit value (step S311: NO).

By repeating the above operation, the discharging power of the battery device 6 converges to 6 kW.

<When the Number of Power Feeding Targets is Four: State C5>

In the state C5, the states of the power factor correction device 2, the battery device 6, and the first to the fourth power feeding targets 200 are as follows.

Input current received by the power factor correction device 2: 120 A.

Input power received by the power factor correction device 2: 24 k.

Output voltage of the power factor correction device 2: 500 V.

Charging or discharging power of the battery device 6: −10 kW (discharging).

Power received by the first power feeding target 200: 8.5 kW.

Power received by the second power feeding target 200: 8.5 kW.

Power received by the third power feeding target 200: 8.5 kW.

Power received by the fourth power feeding target 200: 8.5 kW.

The remaining battery level determination unit 4m checks the remaining battery level of the battery device 6 (step S302). Since the remaining battery level of the battery device 6 is decreased by discharging, the remaining battery level of the battery device 6 does not exceed the upper limit value. As a result, the remaining battery level determination unit 4m outputs a result that the remaining battery level of the battery device 6 is not the upper limit value (step S302: NO). Therefore, the charge and discharge control unit 4n continues the discharging operation. Then, the input current determination unit 4b compares the input power with the upper limit value (step S304).

Assuming that the power of 10 kW is output to the first to fourth power feeding targets 200, the input current received by the power factor correction device 2 is 200 A. Therefore, the input current determination unit 4b outputs a result that the input current (200 A) exceeds the upper limit value (120 A) (step S304: YES). Then, the state determination unit 4h determines the state of the battery device 6 (step S306). At this point in time, the discharging power of the battery device 6 is 6 kW. As a result, the state determination unit 4h outputs a result that the state of the battery device 6 is a discharge state (step S306: YES). Based on this result, the charge and discharge control unit 4n further increases the discharging power of the battery device 6 (step S308).

Then, the discharge amount determination unit 4k determines whether or not the discharging power of the battery device 6 has reached the limit value (10 kW) (step S309). At this point in time, since the battery device 6 has just started discharging, the power discharged by the battery device 6 has not reached the limit value. Therefore, the discharge amount determination unit 4k outputs a result that the discharging power of the battery device 6 has not reached the limit value (10 kW) (step S309: NO). Then, the remaining battery level determination unit 4m checks the remaining battery level of the battery device 6 (step S311). As described above, since the discharge has just started at this point in time, the remaining battery level of the battery device 6 is sufficient. As a result, the remaining battery level of the battery device 6 has not reached the lower limit value. Therefore, the remaining battery level determination unit 4m outputs a result that the remaining battery level has not reached the lower limit value (step S311: NO). By repeating the above operation, the discharging power of the battery device 6 reaches 10 kW.

However, even if the power of 10 kW is output from the battery device 6 as auxiliary power, an input current of 200 A is required to output the power of 10 kW to the first to fourth power feeding targets 200. That is, it is necessary to suppress the input current by a means other than the output of the auxiliary power.

After the discharging power of the battery device 6 reaches 10 kW, the discharge amount determination unit 4k outputs a result that the discharging power of the battery device 6 has reached the limit value (10 kW) (step S309: YES). Based on the result, the voltage control unit 4c outputs a control signal θ for decreasing the output voltage to the power factor correction device 2. In step S309, as a result of outputting the result that the discharging power has reached the limit value (10 kW), the operation including the process of outputting the control signal θ for decreasing the output voltage to the power factor correction device 2 is repeated. As a result, the output voltage converges to, for example, 400 V. As a result, as described above, each of the first to fourth power feeding targets 200 receives an output of the power of 8.5 kW.

<When the Number of Power Feeding Targets Decreases from Four to Three: State C6>

In the state C6, the states of the power factor correction device 2, the battery device 6, and the first to the fourth power feeding targets 200 are as follows. This state C6 corresponds to the completion of charging of the first power feeding target 200.

Input current received by the power factor correction device 2: 120 A.

Input power received by the power factor correction device 2: 24 k.

Output voltage of the power factor correction device 2: 500 V.

Charging or discharging power of the battery device 6: −6 kW (discharging).

Power received by the first power feeding target 200: 0 kW.

Power received by the second power feeding target 200: 10 kW.

Power received by the third power feeding target 200: 10 kW.

Power received by the fourth power feeding target 200: 10 kW.

The remaining battery level determination unit 4m checks the remaining battery level of the battery device 6 (step S302). Since the remaining battery level of the battery device 6 is decreased by discharging, the remaining battery level of the battery device 6 does not exceed the upper limit value. Therefore, the remaining battery level determination unit 4m outputs a result that the remaining battery level of the battery device 6 is not the upper limit value (step S302: NO). Therefore, the charge and discharge control unit 4n continues the discharging operation. Then, the input current determination unit 4b compares the input power with the upper limit value (step S304).

Assuming that the power of 10 kW is output to the second to fourth power feeding targets 200, the input current received by the power factor correction device 2 is 150 A. Therefore, the input current determination unit 4b outputs a result that the input current (150 A) exceeds the upper limit value (120 A) (step S304: YES). Then, the state determination unit 4h determines the state of the battery device 6 (step S306). According to the result of the state C4, in order to output the power of 10 kW to the three power feeding targets 200, 6 kW may be discharged from the battery device 6 as auxiliary power. Therefore, the discharging power of the battery device 6 is set to 6 kW.

The state determination unit 4h outputs a result that the state of the battery device 6 corresponds to the discharge state (step S306: YES). Then, the discharge amount determination unit 4k determines whether or not the discharging power of the battery device 6 has reached the limit value (10 kW) (step S309). Since the discharging power of the battery device 6 is 6 kW, the discharge amount determination unit 4k outputs a result that the discharging power of the battery device 6 has not reached the limit value (10 kW) (step S309: NO). Then, the remaining battery level determination unit 4m checks the remaining battery level of the battery device 6 (step S311). Even at this point in time, since the remaining battery level of the battery device 6 is sufficient, the remaining battery level of the battery device 6 has not reached the lower limit value. Therefore, the remaining battery level determination unit 4m outputs a result that the remaining battery level of the battery device 6 has not reached the lower limit value (step S311: NO). Thereafter, the voltage control unit 4c executes step S301 for increasing the output voltage again. By repeating the above operation, the output voltage of the power factor correction device 2 converges to 500 V.

<When the Number of Power Feeding Targets Decreases from Three to Two: State C7>

In the state C7, the states of the power factor correction device 2, the battery device 6, and the first to the fourth power feeding targets 200 are as follows. This state C7 corresponds to the completion of charging of the first and second power feeding targets 200.

Input current received by the power factor correction device 2: 120 A.

Input power received by the power factor correction device 2: 24 k.

Output voltage of the power factor correction device 2: 500 V.

Charging or discharging power of the battery device 6: +6 kW (charging).

Power received by the first power feeding target 200: 0 kW.

Power received by the second power feeding target 200: 0 kW.

Power received by the third power feeding target 200: 10 kW.

Power received by the fourth power feeding target 200: 10 kW.

The remaining battery level determination unit 4m checks the remaining battery level of the battery device 6 (step S311). Since the remaining battery level of the battery device 6 is decreased by discharging, the remaining battery level of the battery device 6 does not exceed the upper limit value. As a result, the remaining battery level determination unit 4m outputs a result that the remaining battery level of the battery device 6 is not the upper limit value (step S302: NO). Therefore, the charge and discharge control unit 4n continues the discharging operation. Then, the input current determination unit 4b compares the input power with the upper limit value (step S304).

It is assumed that the power of 10 kW is output to the third and fourth power feeding targets 200. According to this assumption, the input current received by the power factor correction device 2 is 100 A. Therefore, the input current determination unit 4b outputs a result that the input current (100 A) does not exceed the upper limit value (120 A) (step S304: NO). Based on this result, the charge and discharge control unit 4n increases the charging power of the battery device 6 (step S305). By repeating the above operation, the charging power of the battery device 6 converges to 6 kW.

Operational Effect

Similar to the wireless power transfer facility 1 according to the first embodiment, the wireless power transfer facility 1D according to the third embodiment can also be managed so that the power consumption does not exceed the upper limit with a simple configuration.

The wireless power transfer facility 1D according to the third embodiment includes the battery device 6 that outputs auxiliary power. The control device 4D controls the battery device 6. According to this configuration, the wireless power transfer facility 1D can cover the power shortage by using the auxiliary power output from the battery device 6.

In the wireless power transfer facility 1D according to the third embodiment, the battery device 6 is used as an auxiliary power output unit. The battery device 6 can store surplus power. The battery device 6 can output the stored power as auxiliary power.

Hereinabove, the embodiment of the present disclosure has been described. However, the present disclosure is not limited to the foregoing embodiment.

What is claimed is:

1. A wireless power transfer facility, comprising:
   a front-stage power conversion unit that converts AC front-stage input power received from an external power source into DC front-stage output power and has a plurality of output terminals for outputting the front-stage output power;
   a plurality of rear-stage power conversion units that are respectively connected to the output terminals of the front-stage power conversion unit and convert DC rear-stage input power including the DC front-stage output power received from the output terminals into AC rear-stage output power;
   a plurality of coils that are respectively connected to the plurality of rear-stage power conversion units and receive the rear-stage output power; and
   a controller that performs control so that the front-stage input power output to the front-stage power conversion unit does not exceed allowable power of the external power source, wherein
   the rear-stage input power is configured only by the front-stage output power,
   the front-stage power conversion unit includes:
      a rectifier unit that receives the front-stage input power and outputs DC intermediate power by rectifying the front-stage input power; and
      a transformer unit that receives the intermediate power and outputs the front-stage output power by transforming a voltage of the intermediate power, the transformer unit includes:
      a step-up unit that steps up the voltage of the intermediate power to a predetermined voltage; and
      one step-down unit that steps down a voltage of power output from the step-up unit to a value corresponding to an instruction of the controller and is connected in parallel with a wiring for connecting the step-up unit to the rear-stage power conversion unit, and
   the controller performs:
      an operation of instructing the transformer unit to output a first voltage as a voltage of the front-stage output power;
      an operation of obtaining information regarding the front-stage input power and comparing the information regarding the front-stage input power with a threshold value when the front-stage output power as the first voltage is output from the front-stage power conversion unit; and
      an operation of instructing the transformer unit to output a second voltage lower than the first voltage as a voltage of the front-stage output power when the information regarding the front-stage input power is not equal to or less than the threshold value.

2. A wireless power transfer facility, comprising:
   a front-stage power conversion unit that converts AC front-stage input power received from an external power source into DC front-stage output power and has a plurality of output terminals for outputting the front-stage output power;
   a plurality of rear-stage power conversion units that are respectively connected to the output terminals of the front-stage power conversion unit and convert DC rear-stage input power including the DC front-stage output power received from the output terminals into AC rear-stage output power;
   a plurality of coils that are respectively connected to the plurality of rear-stage power conversion units and receive the rear-stage output power; and
   a controller that performs control so that the front-stage input power output to the front-stage power conversion unit does not exceed allowable power of the external power source, wherein
   the front-stage power conversion unit includes:
      a step-up unit that steps up the voltage of the intermediate power to a predetermined voltage; and
      one step-down unit that is connected in parallel with a wiring for connecting the step-up unit to the rear-stage power conversion unit, receives the front-stage output power to generate power in which a voltage has been reduced to a value corresponding to an instruction of the controller and applies the reduced power to the output terminals.

* * * * *